United States Patent
Bowman et al.

(10) Patent No.: US 12,191,731 B2
(45) Date of Patent: Jan. 7, 2025

(54) STATOR FOR AN ELECTRIC MACHINE

(71) Applicant: ETA Green Power Limited, Hethel (GB)

(72) Inventors: Liam Bowman, Hethel (GB); Henry Collings, Hethel (GB)

(73) Assignee: ETA Green Power Limited (GB)

( * ) Notice: Subject to any disclaimer, the term of this patent is extended or adjusted under 35 U.S.C. 154(b) by 260 days.

(21) Appl. No.: 17/847,664

(22) Filed: Jun. 23, 2022

(65) Prior Publication Data

US 2022/0416606 A1 Dec. 29, 2022

(30) Foreign Application Priority Data

Jun. 24, 2021 (GB) ..................................... 2109104

(51) Int. Cl.
*H02K 3/47* (2006.01)
*H02K 1/18* (2006.01)
*H02K 3/28* (2006.01)

(52) U.S. Cl.
CPC ............... *H02K 3/47* (2013.01); *H02K 1/187* (2013.01); *H02K 3/28* (2013.01)

(58) Field of Classification Search
None
See application file for complete search history.

(56) References Cited

U.S. PATENT DOCUMENTS 7,098,566 B2 8/2006 Rajasingham
7,402,934 B1 7/2008 Gabrys
(Continued)

FOREIGN PATENT DOCUMENTS

JP 2011072052 A 4/2011
WO 2014033716 A1 3/2014

OTHER PUBLICATIONS

European Search Report for Application No. 22180814.0, dated Dec. 8, 2022, 10 pages.

(Continued)

*Primary Examiner* — Bernard Rojas
(74) *Attorney, Agent, or Firm* — Barnes & Thornburg LLP

(57) ABSTRACT

A stator for interacting with magnets carried by a rotor of an electric machine, the stator comprising: an active region arranged to be aligned with the magnets carried by the rotor; a first inactive region and a second inactive region, wherein the first and second inactive regions are separated by the active region; and a slotless phase winding comprising a plurality of conductive elements, wherein each conductive element comprises a conductor provided in an insulating housing, and wherein the slotless phase winding is arranged in a serpentine structure comprising: a first active segment in which the conductive elements extend across the active region from the first inactive region to the second inactive region; a second active segment in which the conductive elements extend across the active region from the second inactive region to the first inactive region; and an inactive segment coupling the first active segment to the second active segment, wherein the inactive segment comprises a turn provided in the second inactive region, and wherein at least one of the conductive elements is twisted in the second inactive region.

19 Claims, 20 Drawing Sheets

(56) References Cited

U.S. PATENT DOCUMENTS

Figure 1:
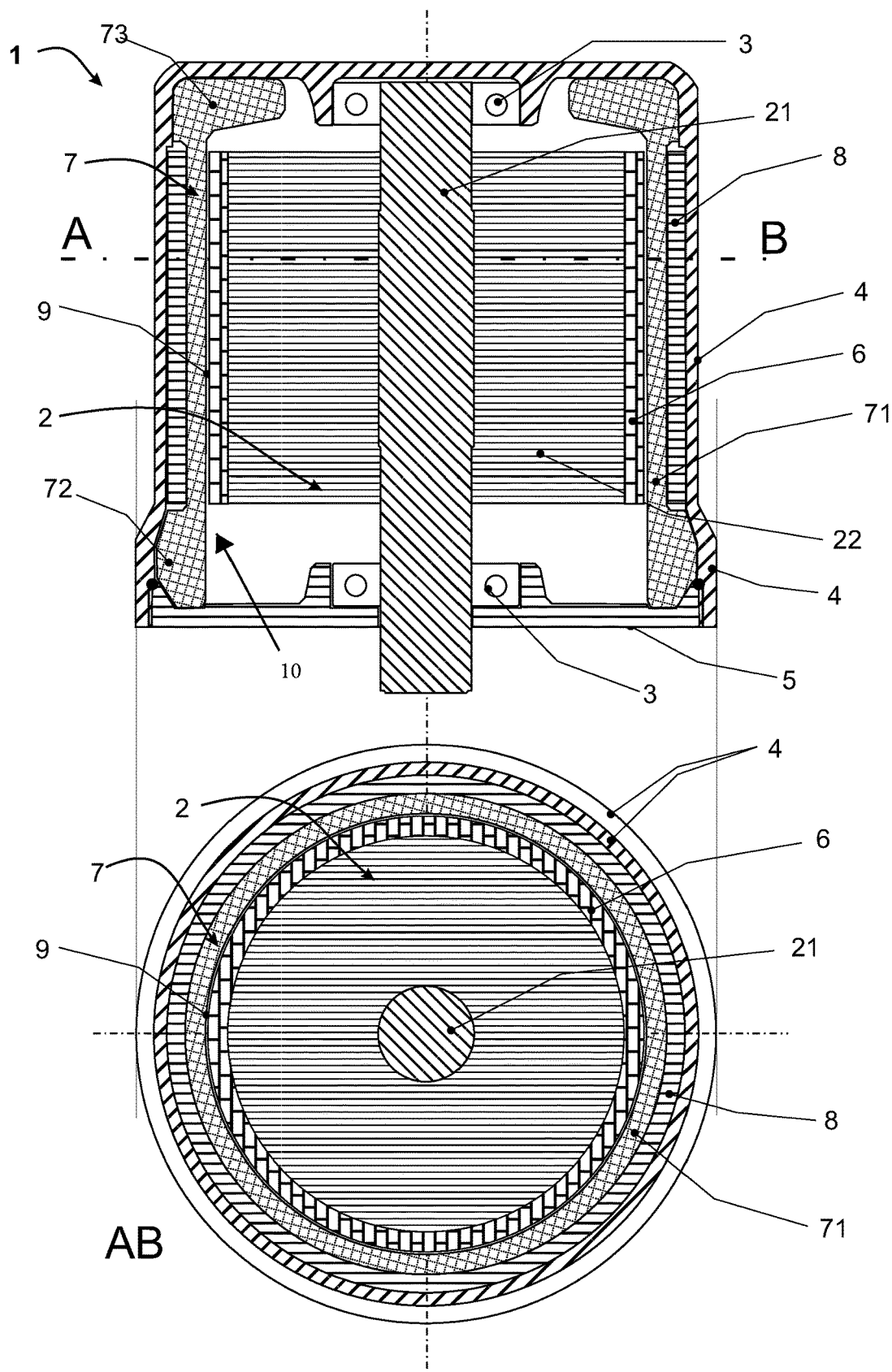

| | | | |
|---|---|---|---|
| 2004/0119362 A1* | 6/2004 | Neet | H02K 3/24 |
| | | | 310/201 |
| 2009/0267441 A1* | 10/2009 | Hiramatsu | H02K 15/066 |
| | | | 310/215 |
| 2020/0161939 A1 | 5/2020 | Takahashi et al. | |
| 2021/0006116 A1 | 1/2021 | Gabrys et al. | |

OTHER PUBLICATIONS

Combined Search and Examination Report for Application No. GB2109104.6, dated Mar. 21, 2022, 10 pages.

* cited by examiner

STATOR FOR AN ELECTRIC MACHINE

PRIORITY CLAIM

This application claims priority to United Kingdom Application No. 2109104.6, filed Jun. 24, 2021, which application is hereby incorporated in its entirety herein.

TECHNICAL FIELD

The present disclosure relates to the field of stators for electric machines.

BACKGROUND

Electric machines, such as motors, are configured to convert electrical energy into mechanical energy. Electric machines typically include a stator and a rotor. The stator surrounds the rotor and includes one or more windings. The rotor has one or more magnets and is coupled to a shaft. By applying current through the windings of the stator, the resulting magnetic field interacts with the magnets of the rotor to drive rotation of the rotor and shaft.

Today small but powerful electric motors are used in many different mobile applications like in lawn mowers or in battery or hybrid powered vehicles. In former times such machines had been driven mostly by combustion engines.

SUMMARY

Aspects of the disclosure are set out in the independent claims and optional features are set out in the dependent claims. Aspects of the disclosure may be provided in conjunction with each other, and features of one aspect may be applied to other aspects.

In an aspect, there is provided a stator for interacting with magnets carried by a rotor of an electric machine. The stator comprises: an active region arranged to be aligned with the magnets carried by the rotor; a first inactive region and a second inactive region, wherein the first and second inactive regions are separated by the active region; and a slotless phase winding comprising a plurality of conductive elements. Each conductive element comprises a conductor provided in an insulating housing. The slotless phase winding is arranged in a serpentine structure comprising: a first active segment in which the conductive elements extend across the active region from the first inactive region to the second inactive region; a second active segment in which the conductive elements extend across the active region from the second inactive region to the first inactive region; and an inactive segment coupling the first active segment to the second active segment, wherein the inactive segment comprises a turn provided in the second inactive region, and wherein at least one of the conductive elements is twisted in the second inactive region.

Embodiments may provide a stator with increased efficiency. In particular, the stator may reduce circulating voltage and/or eddy current losses incurred during operation of the stator. The stator may provide an efficient wide gap stator. The insulating housing for each of the conductive elements may reduce eddy current losses associated with its respective conductor during operation of the stator. The twisting of the at least one of the conductive elements may vary the distance of separation between each conductor and the magnets carried by the rotor (e.g. so that this distance of separation changes about the active region of the stator). This may reduce the total voltage integral associated with the stator because, while individual sub-integrals for smaller portions of the winding may deviate (e.g. increase or decrease relative to adjacent portions of the winding), these deviations will average out over the entirety of the stator. In turn, this will reduce the overall total voltage integral for the stator, thereby providing increased efficiency for operation of the stator. For example, the arrangement of conductive elements and one or more inactive region twists may be selected to minimise a voltage integral for the stator as a whole (e.g. across one or all of the phase windings of the stator).

The electric machine may comprise a slotless direct current machine. The electric machine may be arranged to work as a motor and/or a generator. The stator and magnets of the rotor may thus be arranged to interact so as to transmit: (i) electrical energy (in the form of current/voltage being applied to the stator windings) from the stator into kinetic energy (in the form of rotation) of the rotor, and/or (ii) kinetic energy (in the form of rotation) from the rotor into electrical energy (in the form of a resulting current) at the stator.

For a motor, the stator is configured to selectively apply current to the phase winding so as to generate a corresponding magnetic field for interacting with the magnets of the rotor. This magnetic field will provide a resulting force to the permanent magnets on the rotor. The force on the magnets of the rotor will drive the magnets (and thus the rotor itself) to move relative to the stator windings. In particular, the rotor may be configured to rotate about a rotational axis, and selectively applying current to the phase winding may cause the rotor to spin about its rotational axis. In other words, for a motor, the stator is configured to selectively apply current to the phase winding to drive a rotation of the rotor. For example, the stator is for interacting with magnets carried by a rotor of an electric motor, and the stator is configured to apply current to the slotless phase winding to drive rotation of the rotor of the electric motor.

For a generator, energy will be transmitted to the rotor from an external source, which will cause the rotor to spin about its rotational axis. In so doing, the rotation of the permanent magnets relative to the phase winding of the stator will induce a current in the phase winding. This resulting current may be harnessed as electrical energy (e.g. for storage or for use to power electrical circuitry). In other words, the stator is configured to selectively harness electrical energy brought about by rotation of the permanent magnets of the rotor relative to the phase winding of the stator. For example, the stator is for interacting with magnets carried by a rotor of a generator, and wherein the stator is configured to harness energy from a resulting current generated in the slotless phase winding in response to rotation of the magnets of the rotor of the generator.

The stator is arranged to operate in combination with a said rotor. In particular, the stator may be configured so that, when used in combination with a rotor, the phase winding of the stator will be aligned with the permanent magnets on the rotor. The permanent magnets may occupy an active area of the rotor. That is, the magnets of the rotor may be provided on a surface of the rotor which forms the active area. The magnetic field from the permanent magnets will be strongest in a volume adjacent to this active area. In particular, the magnetic field will be strongest in the region which is aligned with the active area of the rotor, and this magnetic field will decrease in strength with increased distance away from the permanent magnets. The stator may be controlled to operate based on signals received from a sensor of the electric machine. For example, a sensor may be provided for sensing the rotational position of the rotor, and operation of the stator may be controlled based on a sensed rotational position.

The stator may be arranged to be aligned with the rotor so that the active area of the rotor (where the permanent magnets are) is aligned with the active region of the phase winding of the stator. This may comprise the active region of the stator being horizontally or vertically offset from the active area of the rotor. However, the active region of the stator may only be vertically offset, or only horizontally offset, e.g. so as to maximise alignment between the active region of the stator and the active area of the rotor. The inactive regions of the stator may comprise regions which are not aligned with the magnets of the rotor. The inactive regions may comprise regions located beyond the end(s) of the active region of the rotor.

In other words, the active region of the stator may comprise the region of the stator where the magnetic field brought about by the permanent magnets of the rotor is highest. For example, the active region of the stator may comprise the region of the stator which is aligned with the rotor, when the rotor is in position relative to the stator in the electric machine. The inactive regions of the stator may comprise regions of the stator where the magnetic field from the permanent magnets is lower (e.g. regions which are not aligned with the magnets).

The stator may be configured for one of two different types of gap between the stator and a rotor of the electric machine used in combination with the stator. That is, the stator/rotor may have a radial gap or an axial gap.

As a first example, the stator may be arranged to provide a radial air gap between the stator and the rotor. In which case, the stator and the rotor may be coaxial with each other about the rotational axis of the rotor, and wherein the two are radially offset from each other about the rotational axis. For example, the stator may be arranged radially outward of the rotor. The stator may circumscribe a volume in which the rotor may be provided. The stator may therefore form a hollow cylinder, as may the air gap between the stator and the rotor. The rotor may be cylindrical and provided within the hollow cylinder of the stator. The permanent magnets may be provided on a surface of the cylinder of the rotor. The active area of the rotor may be a cylindrical surface on which the magnets are provided. The active region of the stator may be configured to correspond to the active area of the rotor, so that the active region of the stator also comprises a cylindrical surface. This cylindrical surface (active region) of the stator may be arranged to align with the cylindrical surface (active area) of the rotor such that the active area of the rotor fits within the active region of the stator. Both of the longitudinal ends of the active area of the rotor may fit within the longitudinal extent of the active region of the stator (e.g. the longitudinal ends of the active area of the rotor and the active region of the stator may be the same). The inactive regions of the stator may comprise regions which are axially offset from the active region of the stator and/or the magnets (active area) of the rotor. For example, the first inactive region may be axially offset from the second inactive region. The active region of the stator may be in the region axially between the first and second inactive regions (as may be the permanent magnets of the rotor).

For the radial air gap stator, the conductive elements of the phase winding may run parallel to the rotational axis of the rotor in the active region of the stator. That is, in the active region, the active segments extend in an axial direction. The conductive elements turn around in each inactive region, so that they may then extend axially back across the active region of the stator towards the other inactive region. The turn in each inactive region may turn through 180 degrees to reverse the axial direction of the conductive elements. The conductive elements may be twisted as they extend around the turn.

As a second example, the stator may be arranged to provide an axial air gap between the stator and the rotor. In which case, an axial offset may be provided between the stator and rotor. The stator and rotor may be coaxial with each other. Both the stator and the rotor may be circular in cross-section (in the cross-section perpendicular to their axial direction). The permanent magnets may be arranged in an annulus on a surface of the rotor. The surface of the rotor may have a central circular region in which no permanent magnets are provided. Radially outward form the central circular region may be the annular region containing the permanent magnets. Radially outward from the annular region containing the permanent magnets may be another region without any permanent magnets. The annular region of the surface of the rotor may provide the active area of the rotor (e.g. the region where the permanent magnets are located). The annular active area of the rotor may be aligned with the active region of the stator. In other words, the active region of the stator may comprise an annular region which may be aligned with the active area of the rotor so that the two may be axially offset, but the active area of the rotor does not extend radially inward or outward of the active region of the stator. The inactive regions of the stator may be those radially inward and radially outward of the active region of the stator (e.g. the regions which are not axially aligned with the permanent magnets of the rotor).

For the axial air gap stator, the conductive elements of the phase winding may extend radially across the active region of the stator. In other words, the active segments of slotless phase winding may extend in a radial direction orthogonal to the rotational axis of the rotor. That is, in the active region of the stator, the conductive elements will extend radially towards/away from a centre of the stator surface. In the inactive regions, the elements may then turn around so that they can extend back across the active region in a radial direction towards the other inactive region.

The stator may comprise a flux ring. The phase winding may be coupled to the flux ring. For example, the phase winding may be mounted directly onto the flux ring, and/or the phase winding may be mounted onto an intervening layer (such as a polymer layer) for fixing the winding to the flux ring. For a radial air gap stator, the flux ring may comprise a hollow cylinder arranged to circumscribe the phase winding (and permanent magnets on the rotor). For an axial air gap stator, the flux ring may comprise a disc arranged to be axially offset from the active region of the stator (and permanent magnets on the rotor) and to span the radial extent of the winding. The flux ring may be located on the opposite side of the phase winding to the permanent magnets on the rotor. The conductive elements may be separated from the permanent magnets by the air gap (e.g. and nothing else). The stator may also include a housing in which the components of the stator are provided.

Each conductive element comprises a conductor provided within an insulating housing. The insulating housing may completely circumscribe the conductor along its length. The insulating housing may insulate each conductor from adjacent conductors in the phase winding. The phase winding comprises a plurality of conductive elements. The conductive elements of the phase winding may be packaged into a bundle. A bundle may comprise a plurality of conductive elements stacked together. The conductive elements may be stacked into the bundles according to a selected shape (e.g. so that the bundle provides a selected cross-sectional shape). The selected shape may be symmetrical about at least one axis. The selected shape may be symmetrical about a plurality of axis. For example, the selected shape may enable the bundle to be rotated in such a way that its cross-sectional shape is maintained, but the arrangement of the conductive elements within that shape has changed. For example, the cross-sectional shape of the bundle may have orthogonal sides (e.g. square or rectangular), or the sides may not be orthogonal, but may still permit rotation of the shape into a different configuration of conductive elements while preserving that shape (e.g. as per any regular polygon). For example, the conductive elements may be arranged in a hexagonal structure.

The shape of each conductive element in cross-section may be uniform. The insulating housing may be the same thickness around the conductor. A cross-sectional shape of each conductor may be selected to correspond to the cross-sectional shape of the bundle (or it may not). For example, the conductors may be hexagonal, circular, rectangular in cross-sectional shape. The conductors may be symmetrical about at least one axis. The conductor may have a cross-sectional shape so that it may be rotated about at least one angle (not a multiple of 360 degrees) such that its shape is preserved but its relative orientation has changed. Each conductive element may have a thickness (e.g. diameter) of between 10 microns and 2000 microns, such as between 100 and 700 microns, e.g. between 160 and 400 microns.

The conductor of each conductive element may be parallel with the conductors of other conductive elements in the same bundle. For example, in the active region of the stator, the conductors of the bundle may extend across the active region parallel to each other. The conductors may be non-compressed in the active region. The conductors may be non-twisted in the active region. The conductors may be arranged to increase conductive density within the region of the bundle in the active region, e.g. the conductors may be stacked parallel to each other (geometrically parallel, rather than electrically parallel). The phase winding may comprise terminal wires. The phase winding may be coupled to a commutator, such as a multi-phase commutator (e.g. when working as a motor). The phase winding may be coupled to a power supply for supplying current to the windings. A voltage sub-integral may be created in each conductive element separately (e.g. due to the element being electrically insulated).

The serpentine structure may comprise a plurality of active segments and a plurality of inactive segments. The serpentine structure may be arranged in a series so that each active segment leads into an inactive segment, and then from the inactive segment into a subsequent active segment. For example, in each active segment, the conductive elements may extend straight across the active region from one inactive region to the other inactive region. Each inactive segment may couple two active segments together via a turn, so that the conductive elements may again extend straight across the active region of the stator from one inactive region to the other. Each active segment in the phase winding may be separated from its adjacent active segments by a threshold distance (e.g. to enable active segments from other windings to be provided in the separation region. Each of the conductive elements in the phase winding (e.g. in the same bundle) may follow the same serpentine path about the stator.

Each active segment may comprise a region where the conductive elements are aligned with the permanent magnets of the rotor (e.g. in a region where magnetic field strength is relatively high). Each inactive segment may comprise a region where the conductive elements are not aligned with the permanent magnets of the rotor, such as being axially or radially offset from the magnets (e.g. in a region where magnetic field strength is relatively low). The conductive elements in the active segment are arranged for interaction with the magnets of the rotor. For example, for a radial gap, the conductive elements in each active segment extend axially (parallel to the rotational axis of the rotor) between the inactive regions. Thus, the active segments are a series of straight axial segments arranged on the surface of the cylinder which is aligned with the magnets of the rotor. For example, for an axial gap, the conductive elements in each active segment extend radially (orthogonal to the rotational axis of the rotor) between the inactive regions. Thus, the active segments are a series of straight radial segments arranged on an annular region which is aligned with the magnets of the rotor.

Each conductive element may exit the active region into an inactive region, and that conductive element is then turned so that it may re-enter the active region from that inactive region. Current flow along the conductor of each conductive element will travel from the active region into the inactive region, where that element is turned so that the current will then flow back into the inactive region. Each turn may provide a continuity path whereby the conductive element bends around to return back to the active region. The turn may include a twist, or it may not. Where no twist is provided, the turn may bend the conductive elements around so that they return to the active region from the inactive region in the same configuration in which they entered the inactive region. Where there is a twist in an inactive region, the conductive elements will bend around so that they return to the active region from the inactive region, but they will be arranged in a different configuration to that in which they entered the inactive region. The turn may comprise a bending in the same plane, or the bend may include a component out of that plane. For example, the first active segment and the inactive segment may be provided in the same plane, or the inactive segment may extend out of that plane as it turns around in the inactive region. The turn may comprise a bending of the conductive elements so that they change the direction in which they extend from a first direction (across the active region from the first inactive region towards the second inactive region) to a second direction (back across the active region from the second inactive region towards the first inactive region).

The plurality of conductive elements may be substantially parallel with each other in the first and/or second active segment. For example, in each active segment of the phase winding, the conductive elements within that bundle will run parallel to each other across the active region. The conductive elements may not run parallel to each other in the inactive regions (e.g. as they twist and/or turn). The conductive elements in the first active segment may be substantially parallel to the conductive elements in the second active segment. For example, for a radial gap stator, each of the active segments may be parallel to each other and to the rotational axis of the rotor. For an axial gap stator, each active segment may not be parallel to its adjacent active segment, but the distance of separation between adjacent active segments at a boundary between the active region and the first inactive region may correspond to the distance of separation between those adjacent active segments at a boundary between the active region and the second inactive region. For example, two adjacent active segments in an axial gap stator may extend along lines so that the two lines would intersect in the centre of the stator (if they extended that far). The conductive elements may extend straight and untwisted across the active region.

At least one of the conductive elements is twisted in the inactive region. For example, the twisting may occur as the at least one conductive element extends around the turn. Twisting may be relative to a single conductive element within a phase winding, or relative to the plurality of conductive elements of the phase winding as a whole (e.g. to the bundle of conductive elements which forms the phase winding). For example, twisting may comprise a rotation about a longitudinal axis, such as a rotation of an individual conductive element about the longitudinal axis of that conductive element, and/or a rotation of a bundle of conductive elements about the longitudinal axis of that bundle of conductive elements. The longitudinal axis of an individual conductive element may comprise the central axis extending along the length of that element as it traces its way along the serpentine structure. The longitudinal axis of the bundle of conductive elements may comprise the central axis of the bundle extending along the length of the bundle along the serpentine structure.

A conductive element may be twisted in the sense that it has been rotated relative to its longitudinal axis. The conductive element may transition from the first active segment to the inactive segment having a particular orientation, and that conductive element may transition from the inactive segment to the second active segment having a different orientation. For example, an orientation of the conductive element may change, e.g. so that the conductive element is provided in a different orientation in adjacent active segments. For example, the conductive element in the first active segment may be in a different rotational position relative to the conductive element in the second active segment.

A conductive element may be twisted in the sense that its position and/or orientation relative to the other conductive elements of the phase winding has changed. For example, the arrangement of conductive elements within the plurality of conductive elements of the phase winding may have changed between the first and second active segments. For example, for any one conductive element of the phase winding, its distance of separation to the magnets of the rotor may change as it extends along the serpentine structure (e.g. so that it in some active regions that conductive element is closer to the rotor magnets than in other active segments).

For the phase winding, the plurality of conductive elements may be packaged into a bundle. The bundle may have a selected shape in cross-section. The selected cross-sectional shape for the bundle may be the same in adjacent active segments (e.g. the selected cross-sectional shape may remain constant for all of the active segments of the stator). However, the arrangement of conductive elements within that bundle may change between different active segments, e.g. so that conductive elements in subsequent active segments have a different positional configuration. For example, when viewing the bundle in cross-section in the first active segment compared to the second active segment, one or more of the conductive elements may have been individually rotated and/or the bundle itself may have been rotated as a whole. As a result, the configuration of the plurality of conductive elements of the phase winding will change between the first and second active segments. At least one of the conductive elements will therefore be separated from the magnets of the rotor by a different distance, or will be in a different orientation relative to the magnets, in the second active segment as compared to the first active segment.

For example, the plurality of conductive elements may be packaged into a bundle. The bundle may be twisted in the second inactive region. For example, the bundle may be twisted as it extends around the turn in the second inactive region. The arrangement of the different conductive elements within the bundle may change as the bundle is twisted. As a result, at least one of the conductive elements within the bundle will be at a different distance of separation from the magnets of the rotor in the second active segment as compared to the first active segment. For example, the bundle being twisted may comprise a rotation of the bundle relative to its longitudinal axis. The shape of the bundle may be the same in cross-section in the first and second active segments, but the arrangement of conductive elements within that bundle may have changed between first and second active segments. The bundle may be twisted in each inactive region of the stator, or it may only be twisted in some of the inactive regions. For example, subsequent twists may be the same, e.g. a twist in the first inactive region may comprise a selected amount of rotation of the bundle about its longitudinal axis, and the next twist in the second inactive region may comprise the same amount of rotation. The subsequent twist may comprise rotation to reverse the previous change, e.g. so that every second active segment (where twisting has occurred) will have the conductive elements arranged in the same configuration.

The turn in the inactive region may comprise a change in direction for the phase winding (e.g. a change in direction of current flow). Each turn may revert the direction for the phase winding so that the conductive elements may again extend across the active region from one inactive region towards the other inactive region. The twist in the inactive region may comprise a change in the arrangement and/or orientation of individual conductive elements within the bundle/of the bundle as a whole. The twisting may occur during the turn.

The inactive segment of the serpentine structure of the slotless phase winding may be a first inactive segment, and the serpentine structure of the slotless phase winding may further comprise a second inactive segment and a third active segment. The second inactive segment may couple the second active segment to the third active segment. The second inactive segment may comprise a turn provided in the first inactive region. At least one of the conductive elements may be twisted in the first inactive region, e.g. the twisting may occur during the turn. The twist in the first inactive region may comprises a half twist (e.g. a rotation of a bundle of conductive elements by 180 degrees about the longitudinal axis of the bundle). The twist in the second inactive region may also comprise a half twist. A twist may provide a change of position of individual conductive elements in the bundle and/or a change of orientation of the conductive elements/the bundle. For example, the twist may be configured so that the internal arrangement of conductive elements in the first active region is different to that in second active region. A half twist may comprise 180 degrees of rotation when comparing the first active segment to the second active segment. Conductive elements and/or the bundle as a whole may be twisted and/or compressed in the inactive regions.

The bundle of conductive elements may be at least 5 elements deep, such as 10 elements deep. In other words, the conductive elements which form the bundle may be arranged in layers, with at least 5 (e.g. 10 or more) layers of separate conductive elements included. The bundle of elements may be mechanically connected and/or supported. For example, a potting material may be used to bind the different conductive elements together. For example, the conductive elements may be moulded together, e.g. the stator itself (including the conductive elements) may be moulded with a polymer or resin to provide support to the structure. The bundle of conductive elements may be twisted through 360° in the inactive region. This may not alter the spatial arrangement of conductive elements through that one inactive region twist, but it may reduce volume associated with the winding.

The stator may be a multi-phase stator. The slotless phase winding may be a first slotless phase winding, and the stator is a multi-phase slotless stator comprising a plurality of slotless phase windings. Each of the plurality of slotless phase windings may be a phase winding of the type described above. The first active segment of the first slotless phase winding may be offset from the second active segment of the first slotless phase winding in the active region. Each of the plurality of slotless phase windings may be arranged in a serpentine structure. The serpentine structure of the first slotless phase winding may interlaced with the serpentine structure of one or more of the other slotless phase windings of the stator. For example, each of the phase windings may be arranged in a repeating serpentine structure about the stator. The repeating structure of each phase winding may be offset with respect to the structure of the other phase windings so that they may all be provided on the stator without overlapping the conductive elements of different phase windings in the active region. A first active segment of a second slotless phase winding may be arranged between the first and second active segments of the first slotless phase winding. An inactive segment of the second slotless phase winding may be coupled to the first active segment of the second slotless phase winding. The inactive segment of the second slotless phase winding may comprise a turn provided in the second inactive region, and wherein at least one of the conductive elements of the second slotless phase winding may be twisted in the second inactive region.

The stator may be arranged to enable the conductive elements of the turn of the first slotless phase winding to pass through the turn of the second slotless phase winding. The second active segment of the first slotless phase winding may be arranged in the active region between first and second active segments of the second slotless phase winding. The turn of the first slotless phase winding may be arranged adjacent to the turn of the second slotless phase winding. The first slotless phase winding may be provided with the same twist as the second slotless phase winding. For example, the change of configuration/orientation of the conductive elements of the first phase winding between its first and second active segments may be the same as the change of configuration/orientation of the conductive elements of the second phase winding between its first and second active segments. A first active segment of a third slotless phase winding may be provided in the active region between the first and second active segments of the first slotless phase winding. Both the second and third phase windings may be the same as the first winding. Further phase windings may also be provided.

Aspects of the present disclosure may provide an electric machine comprising: a stator as disclosed herein, and a rotor carrying a plurality of magnets. The electric machine is arranged so that the magnets carried by the rotor are aligned with the active region of the stator. The electric machine may comprise a motor and/or a generator, as disclosed herein. A distance of an air gap between the magnets of the rotor and the active region of the stator may be smaller than a cross-sectional depth of the plurality of conductive elements of the slotless phase winding. For example, a depth of the bundle of conductive elements may be greater than the air gap. The depth of the conductive elements may be large relative to the air gap. For example, the conductive elements may fill at least half of the magnetic gap, such as more than 60% of the magnetic gap. A flux ring may be provided behind the phase winding (e.g. away from the rotor). The flux ring may be configured to close the magnetic field circle. The magnetic gap may comprise the distance of separation between the flux ring (e.g. its inner surface) and the permanent magnets of the rotor (e.g. their outer surface). The flux ring may have a similar depth to the magnetic air gap depth. For example, the flux ring depth may be substantially the same, if not higher. For example, the air gap may less than 1 mm, such as less than 0.6 mm.

FIGURES

Figure 2:
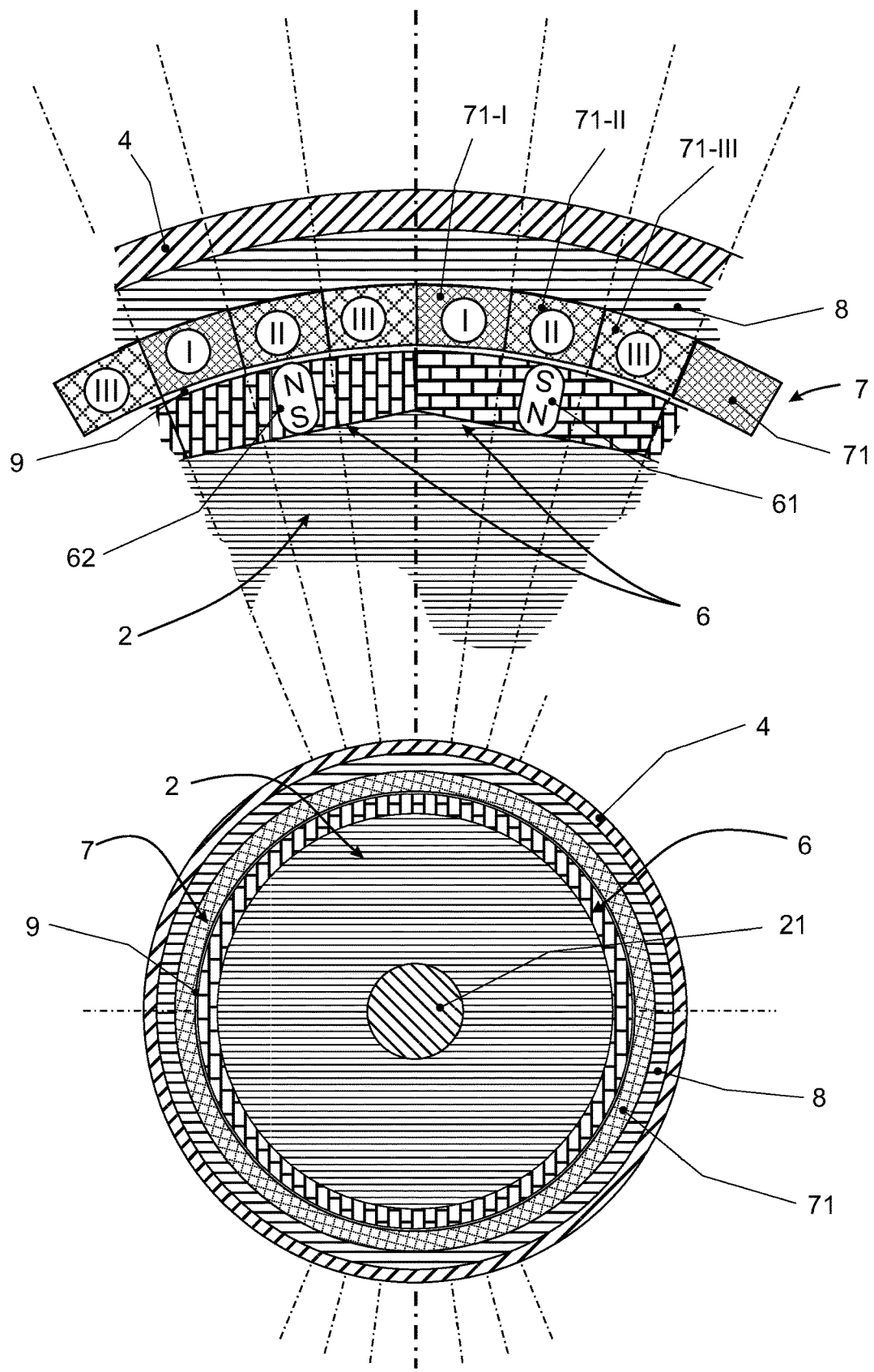
Figure 3:
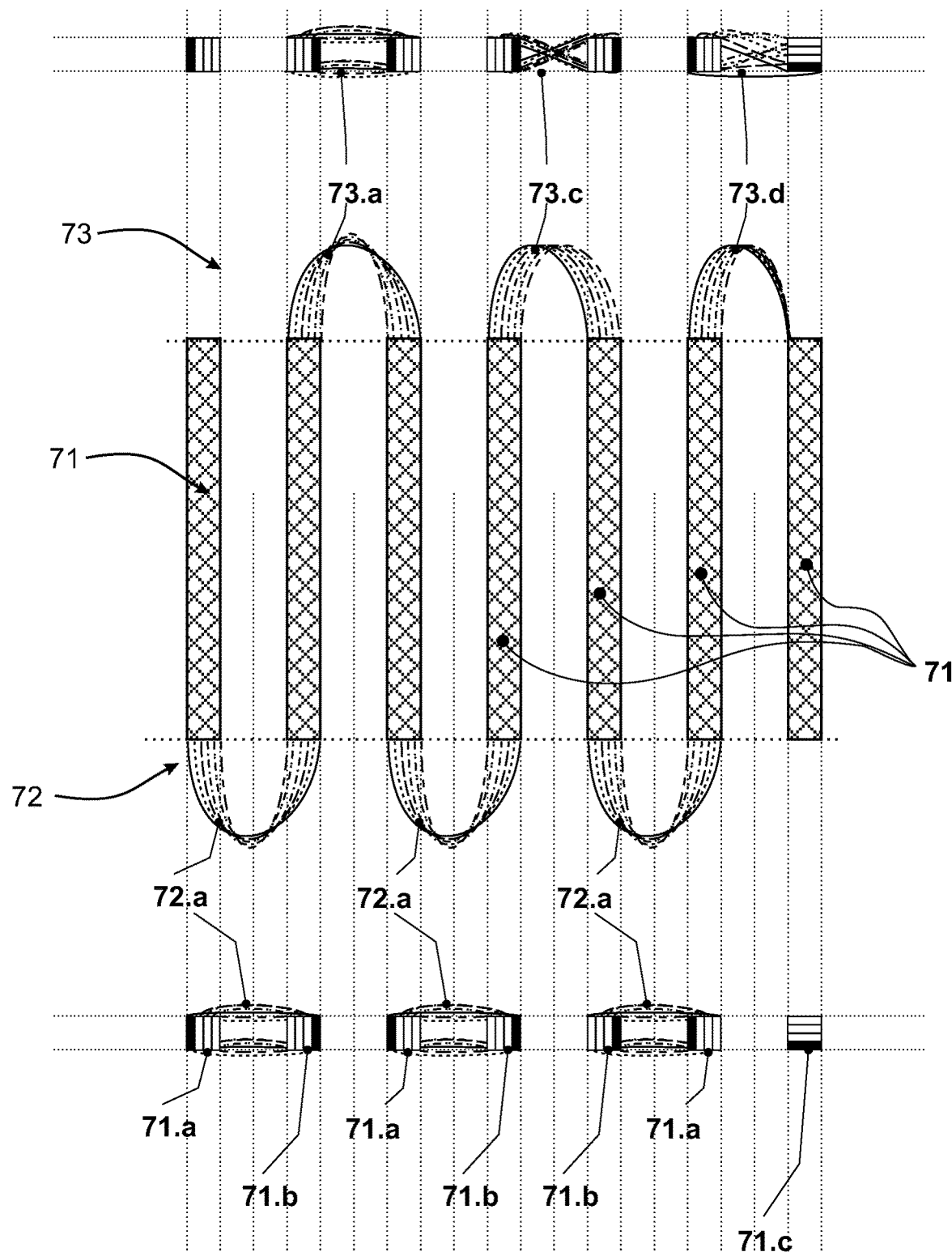
Figure 4:
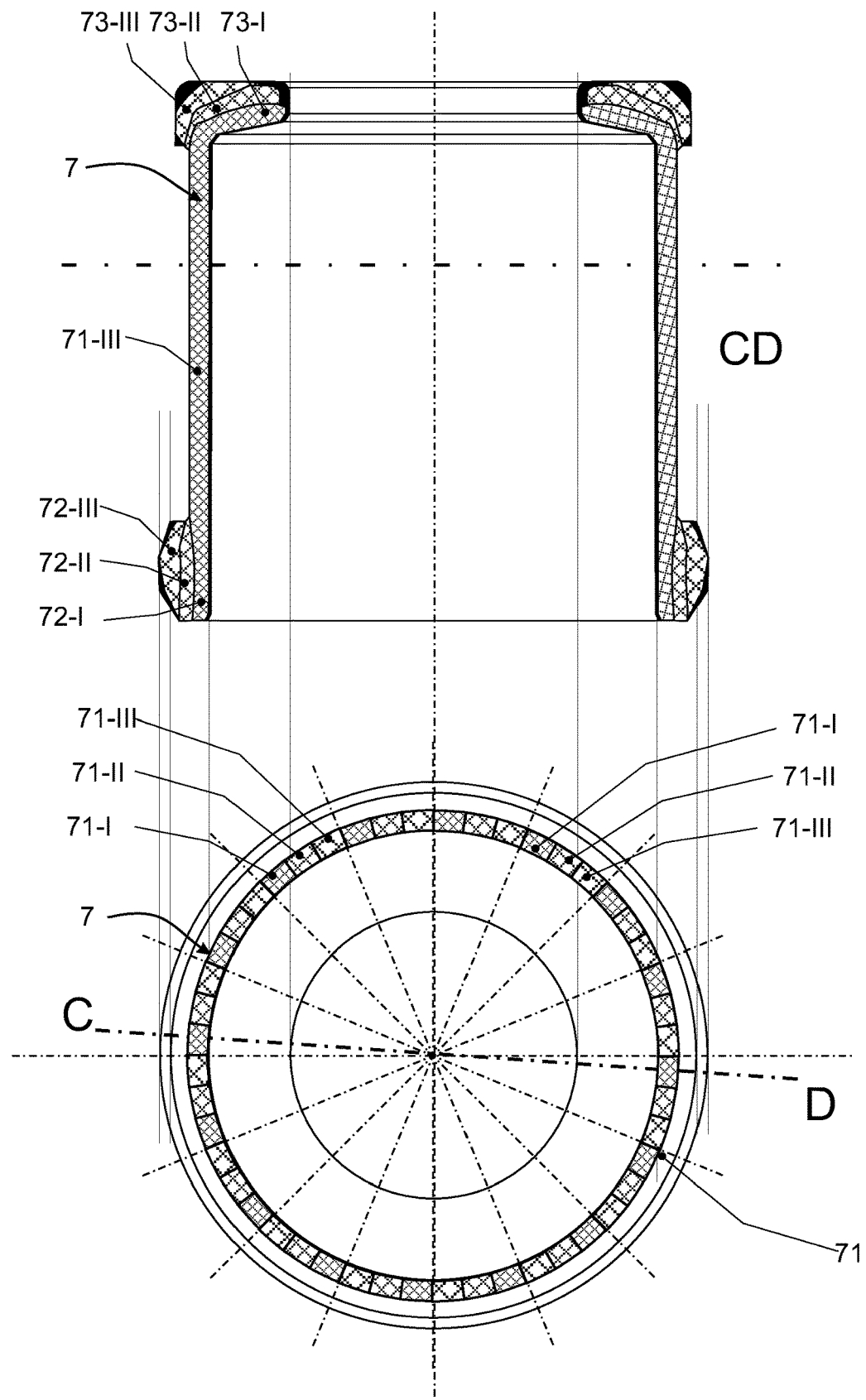
Figure 5:
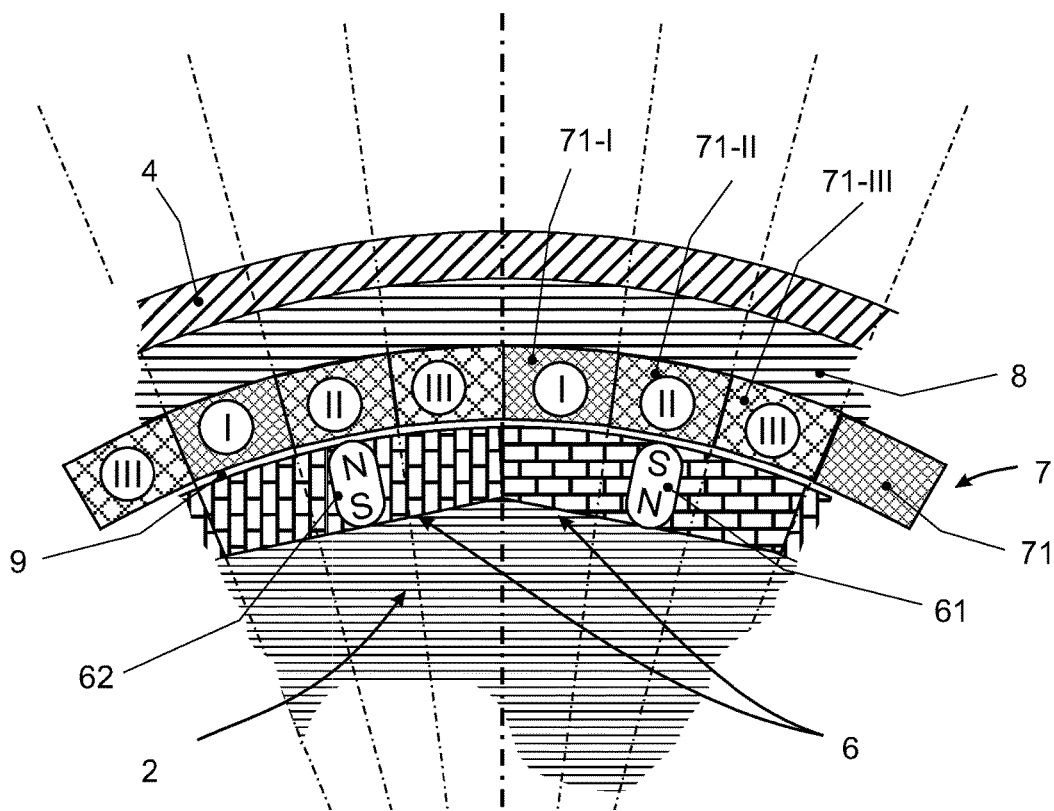
Figure 5:
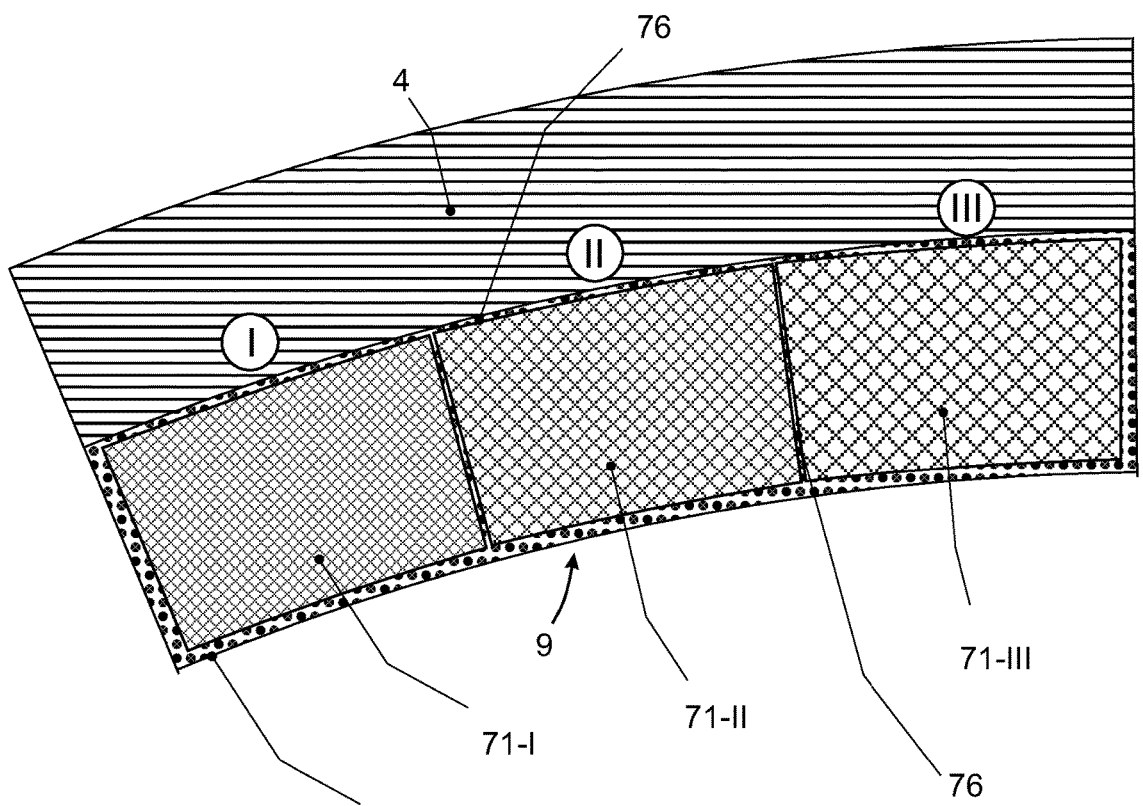
Figure 6:
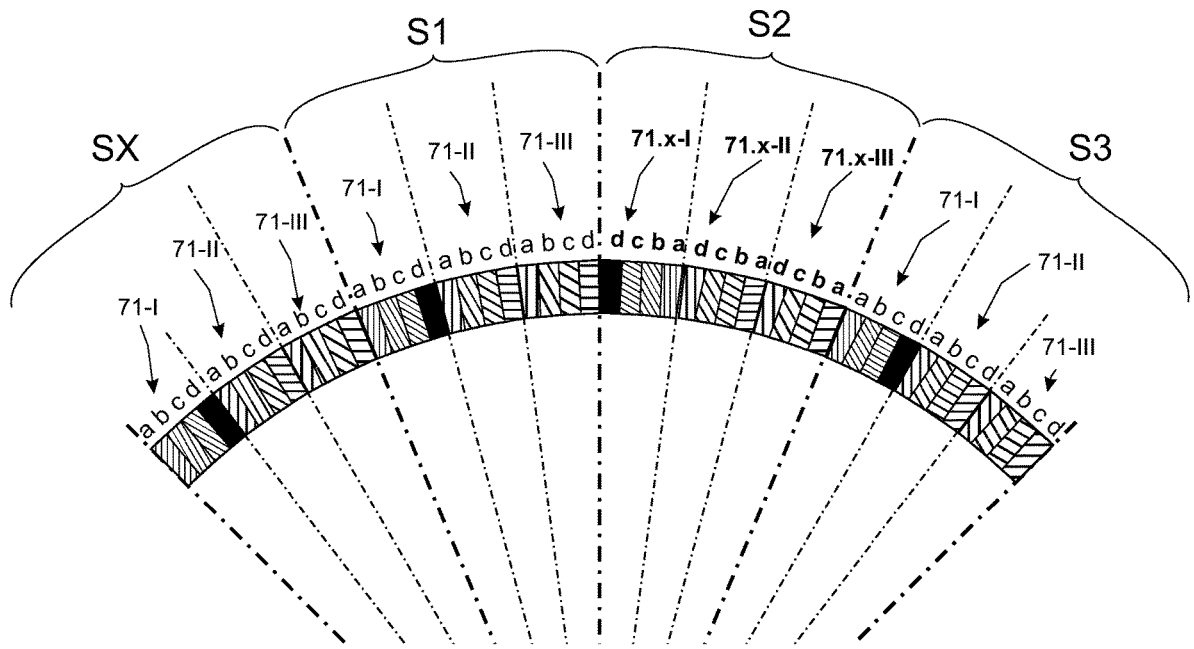
Figure 6:
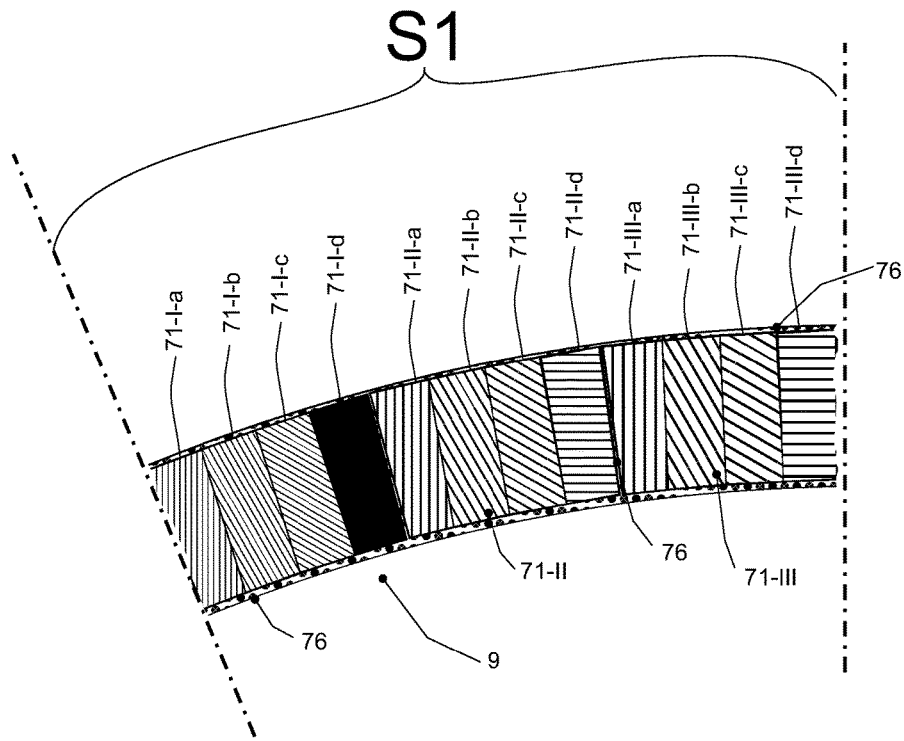
Figure 7:
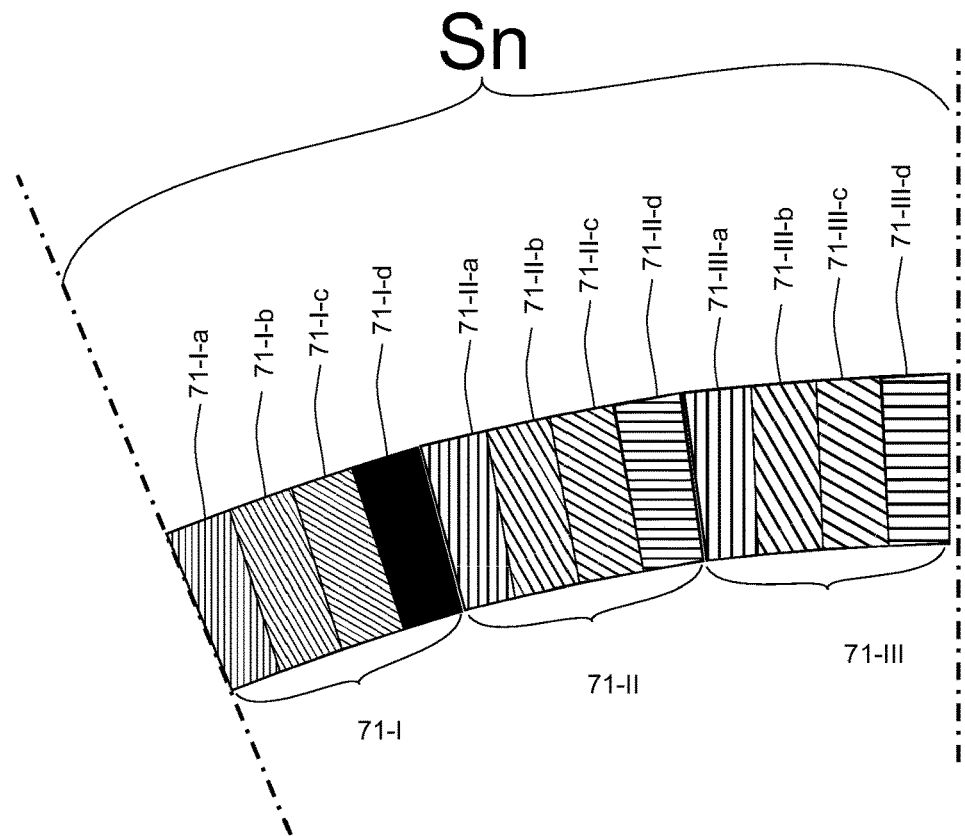
Figure 7:
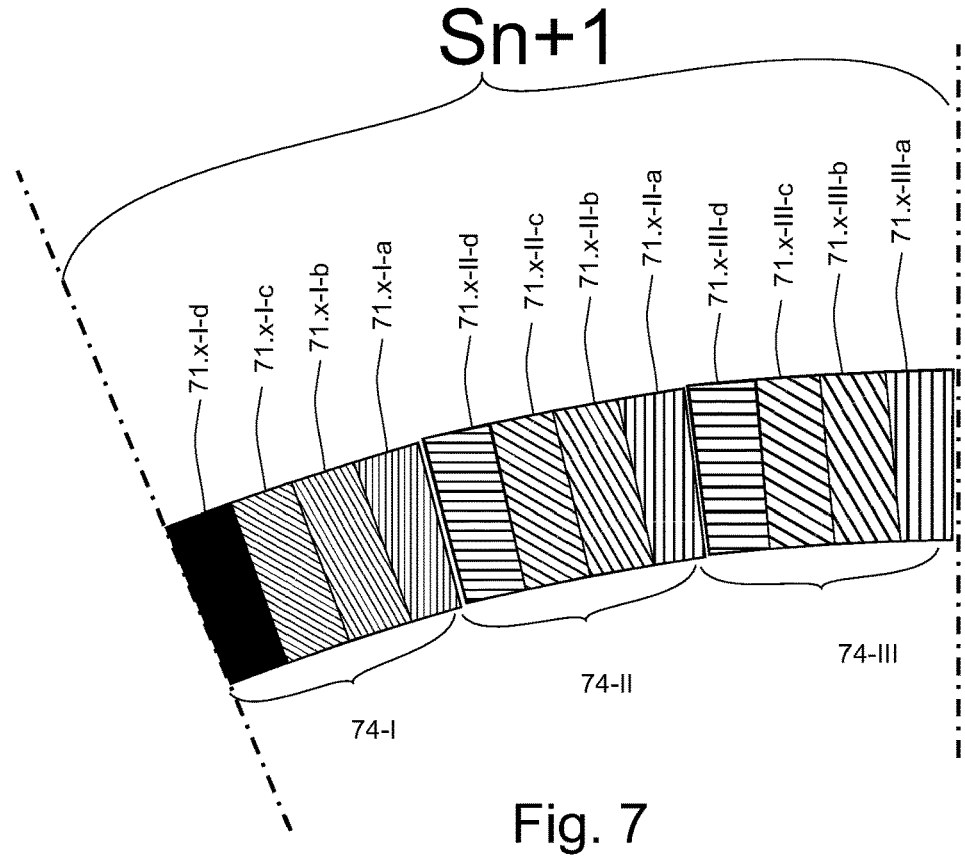
Figure 8:
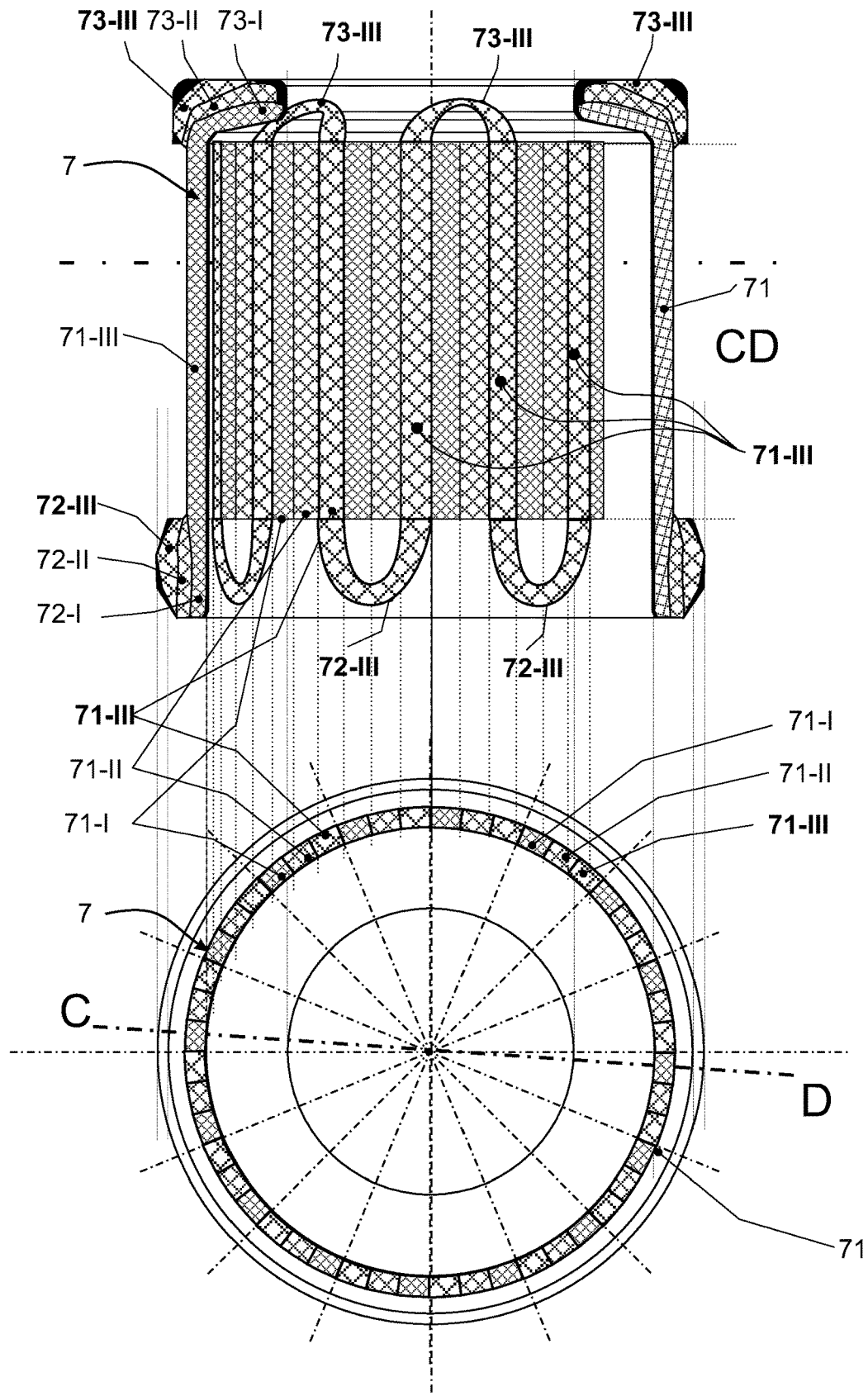
Figure 9:
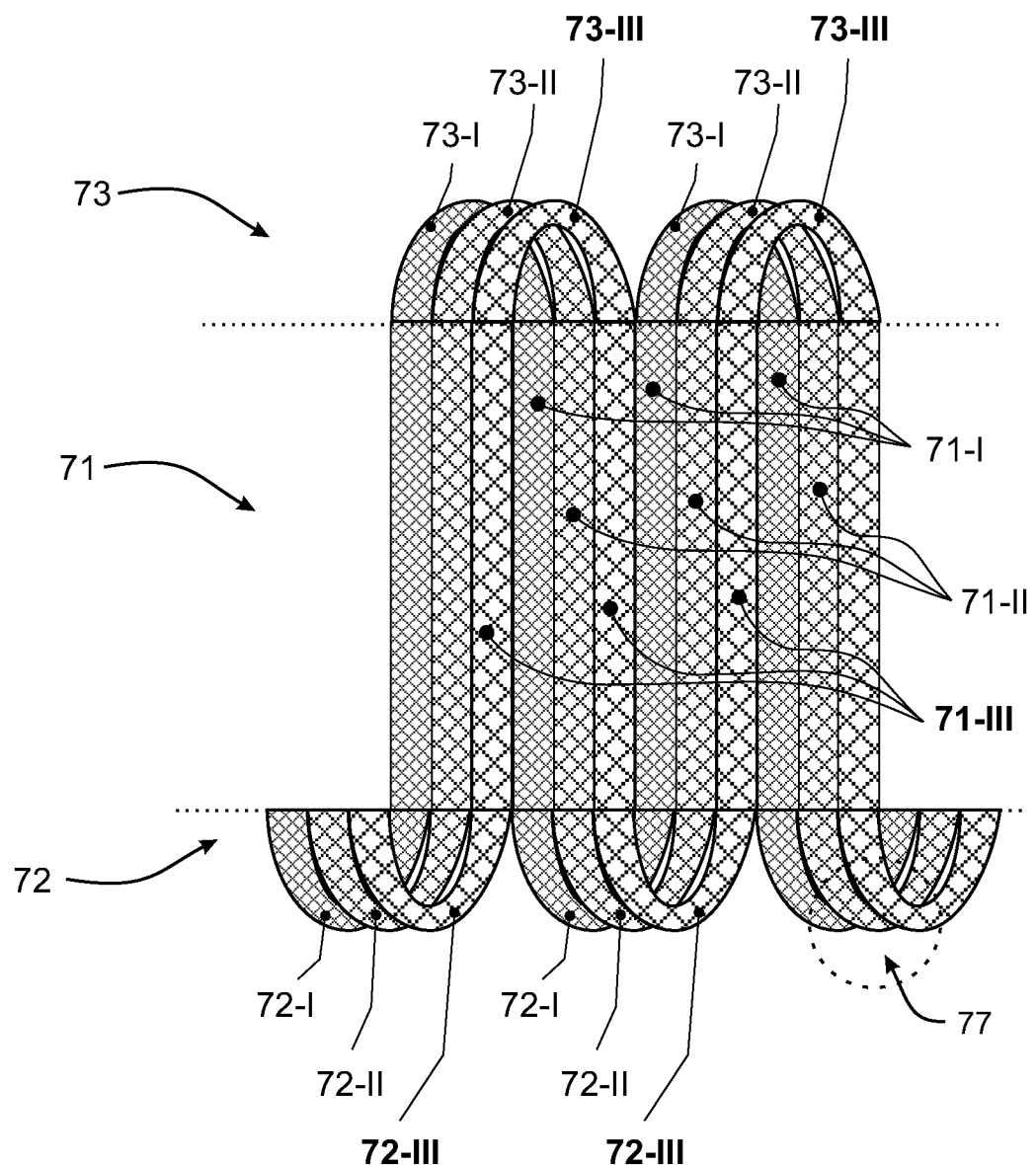
Figure 10:
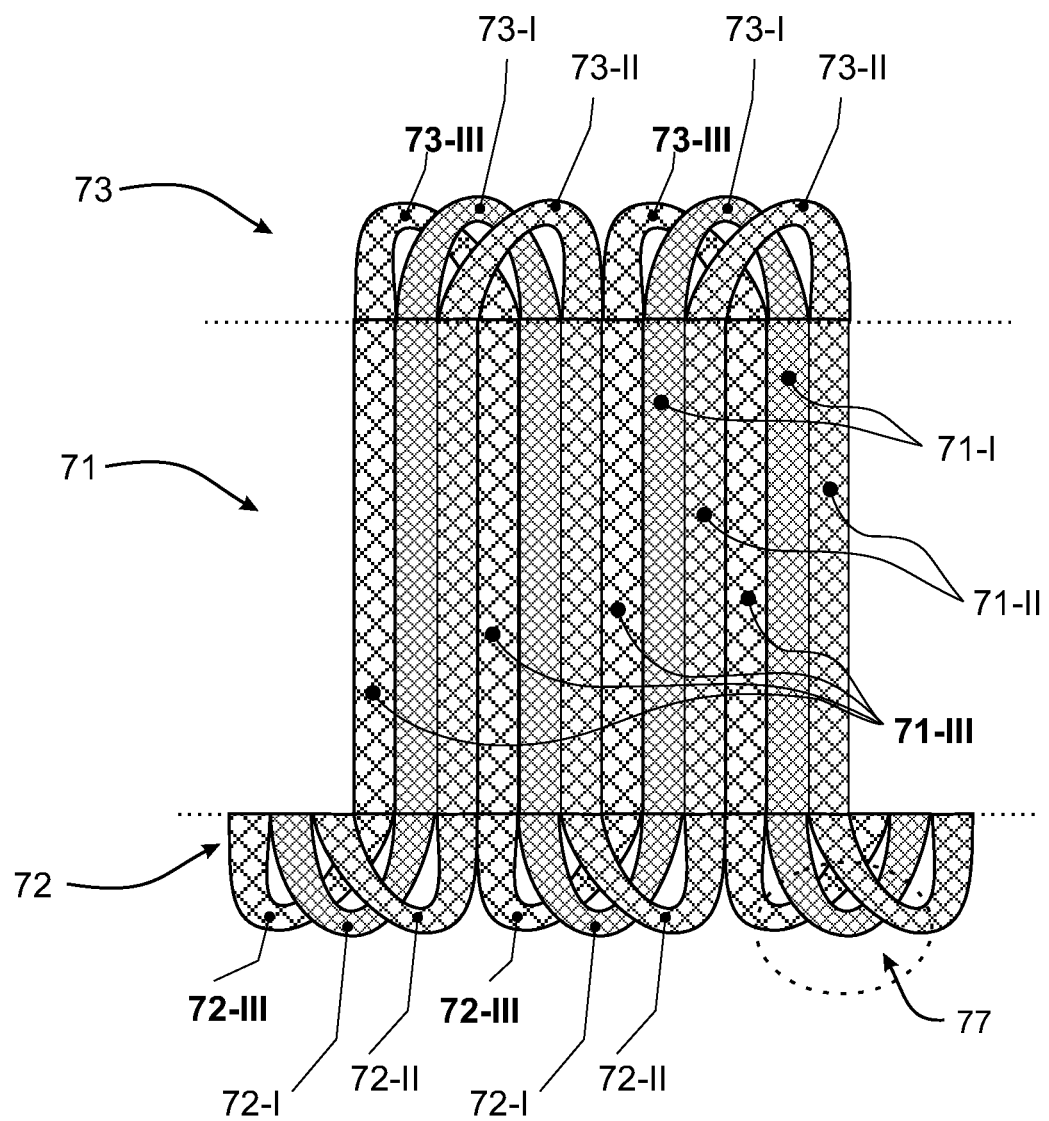
Figure 11:
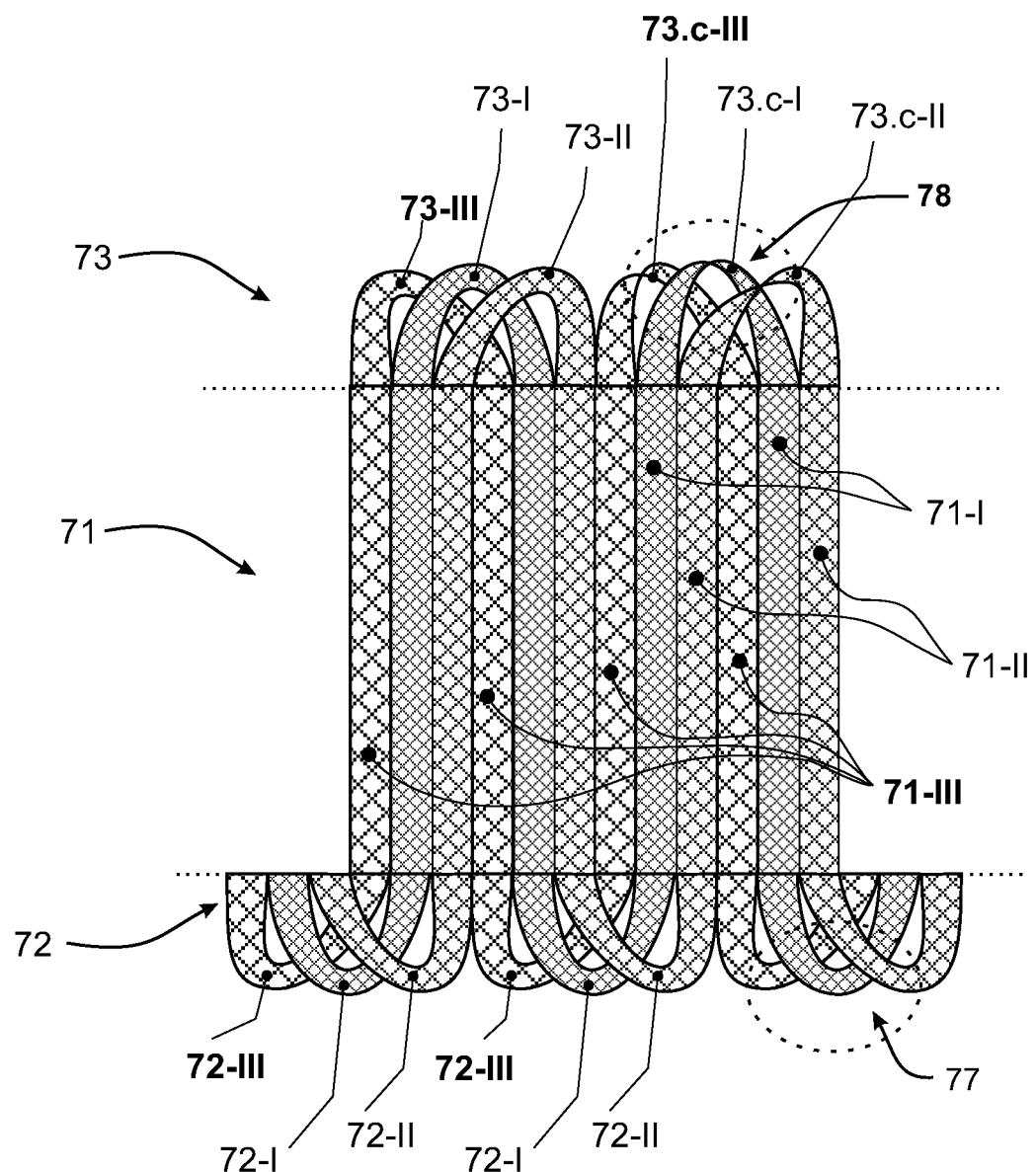
Figure 12:
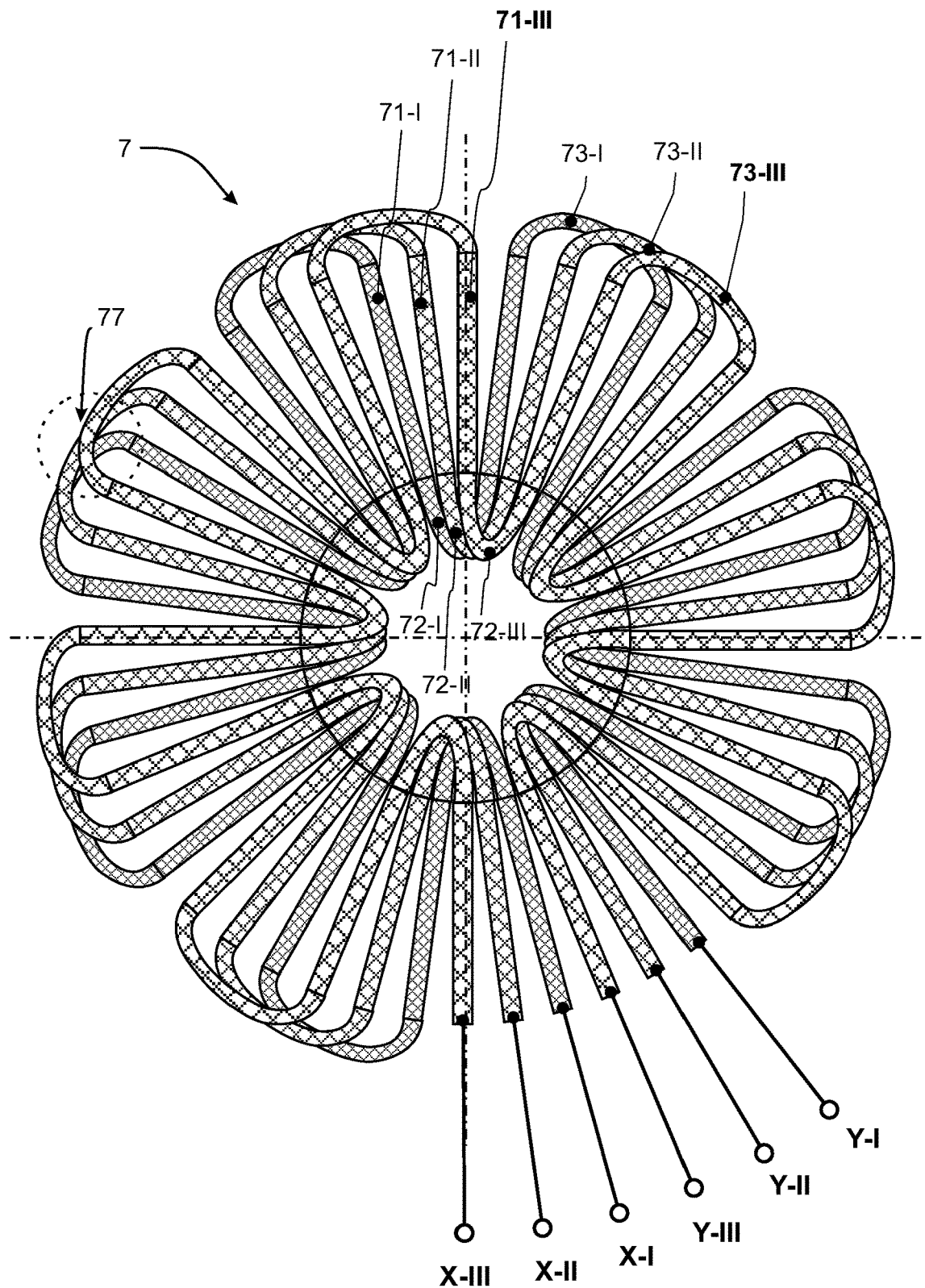
Figure 13:
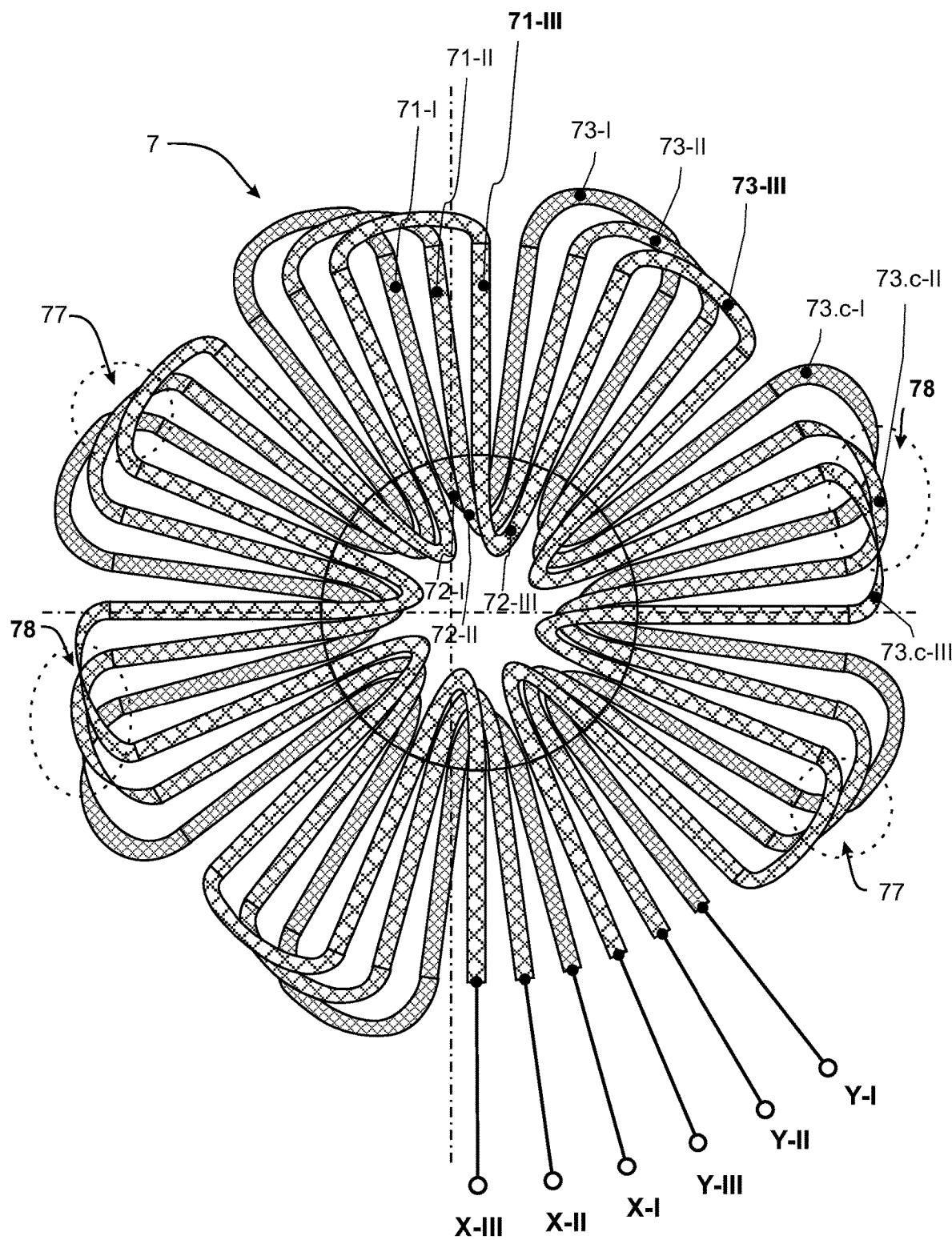
Figure 14:
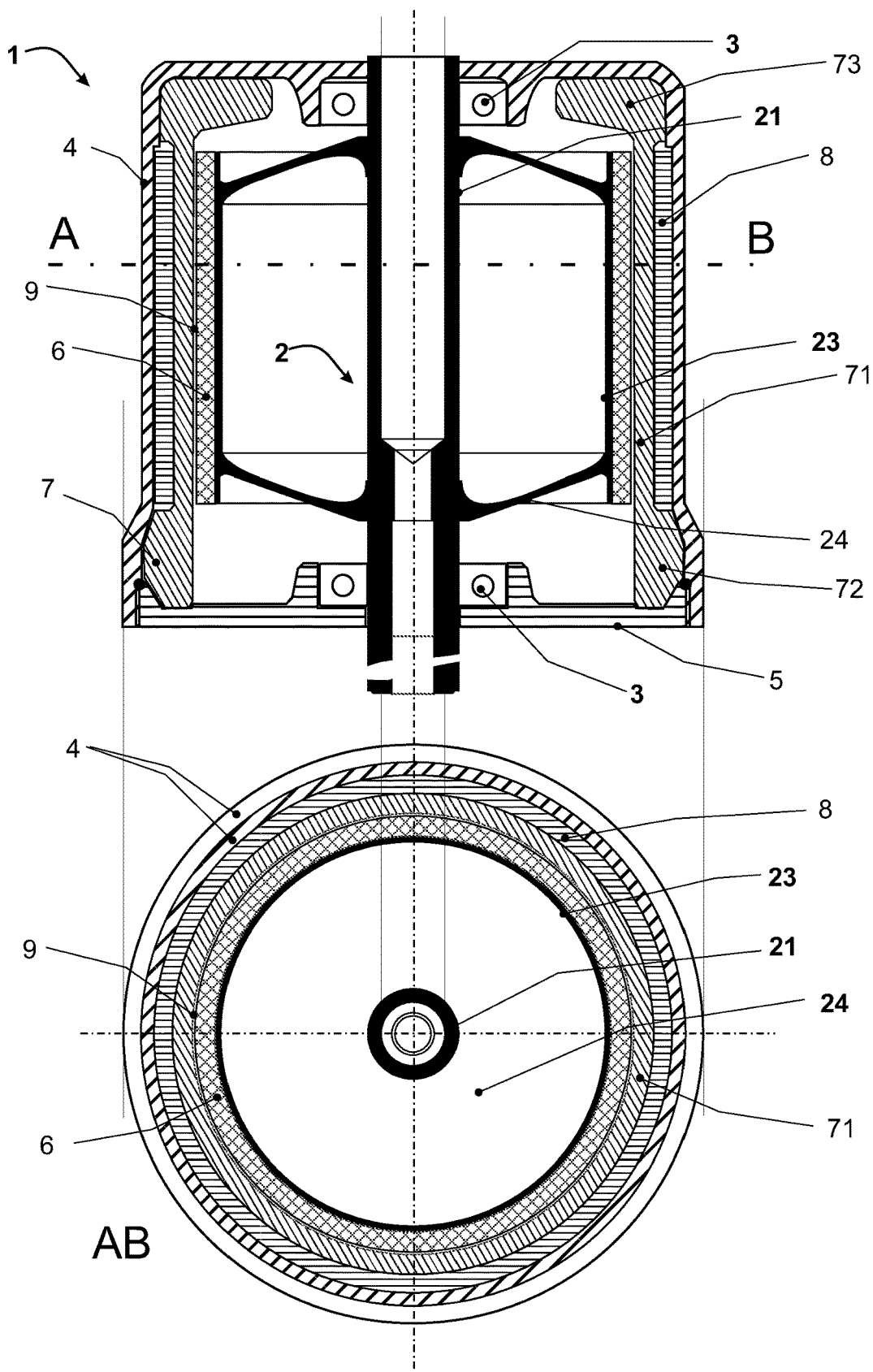
Figure 15:
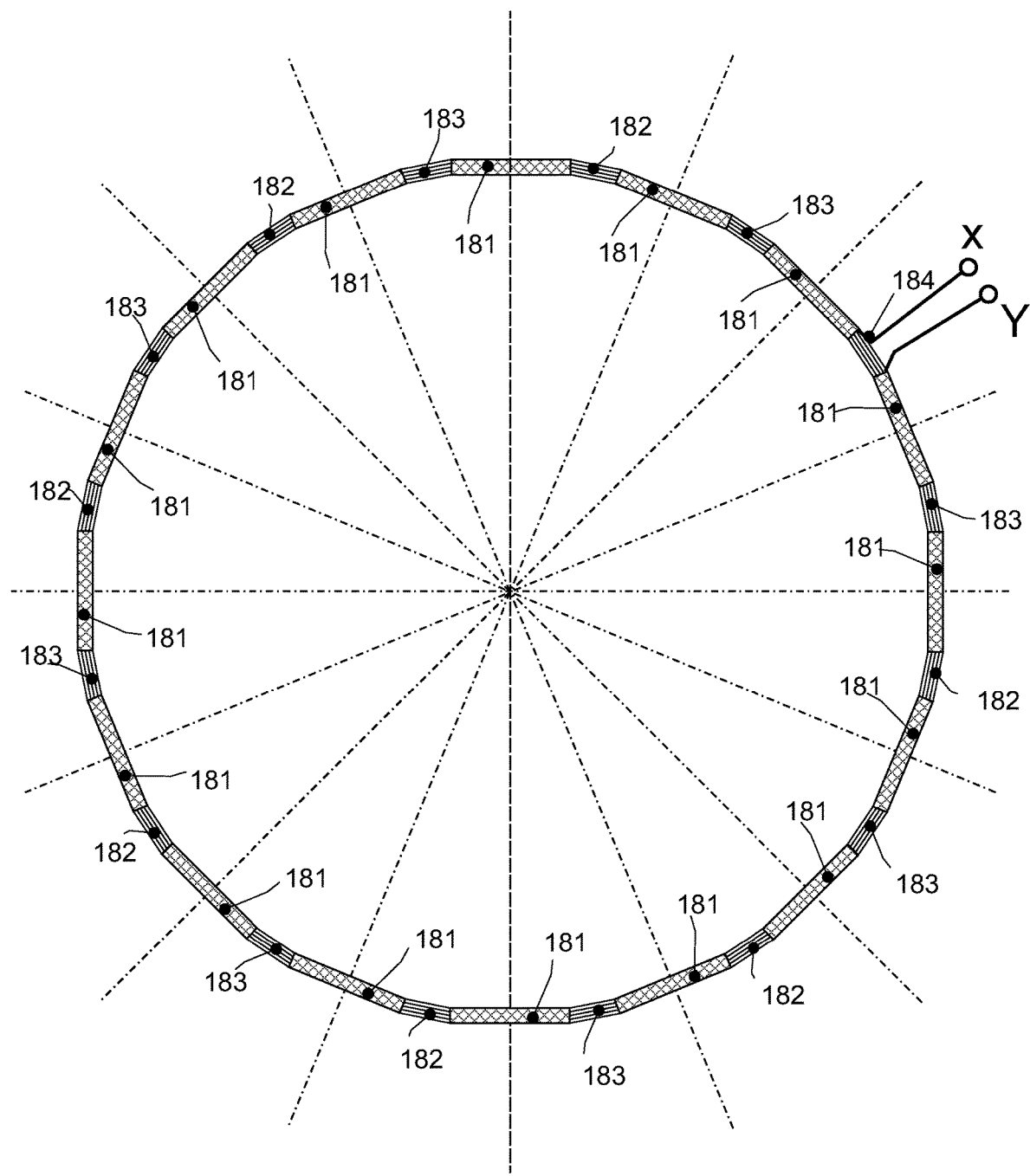
Figure 16:
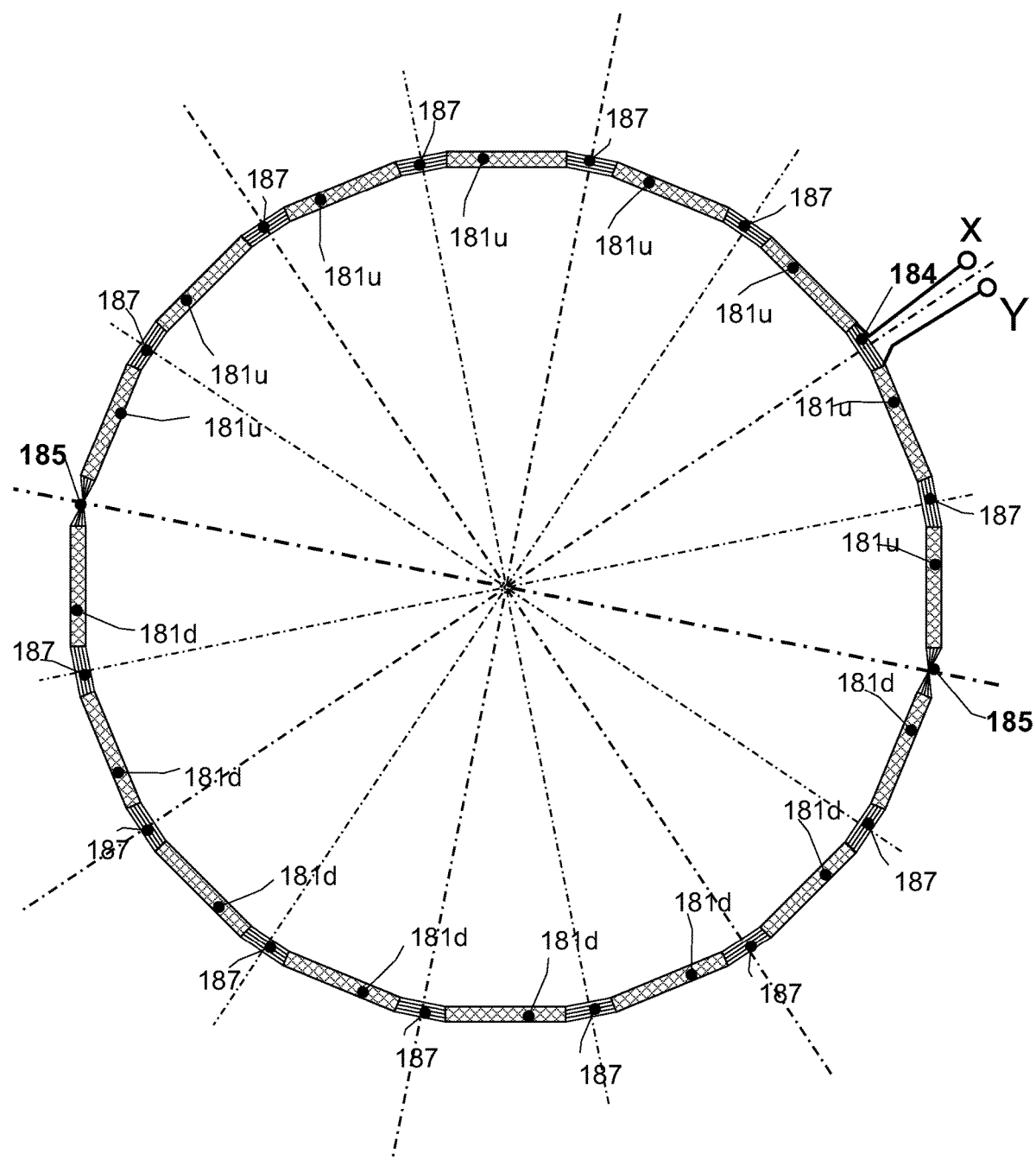
Figure 17:
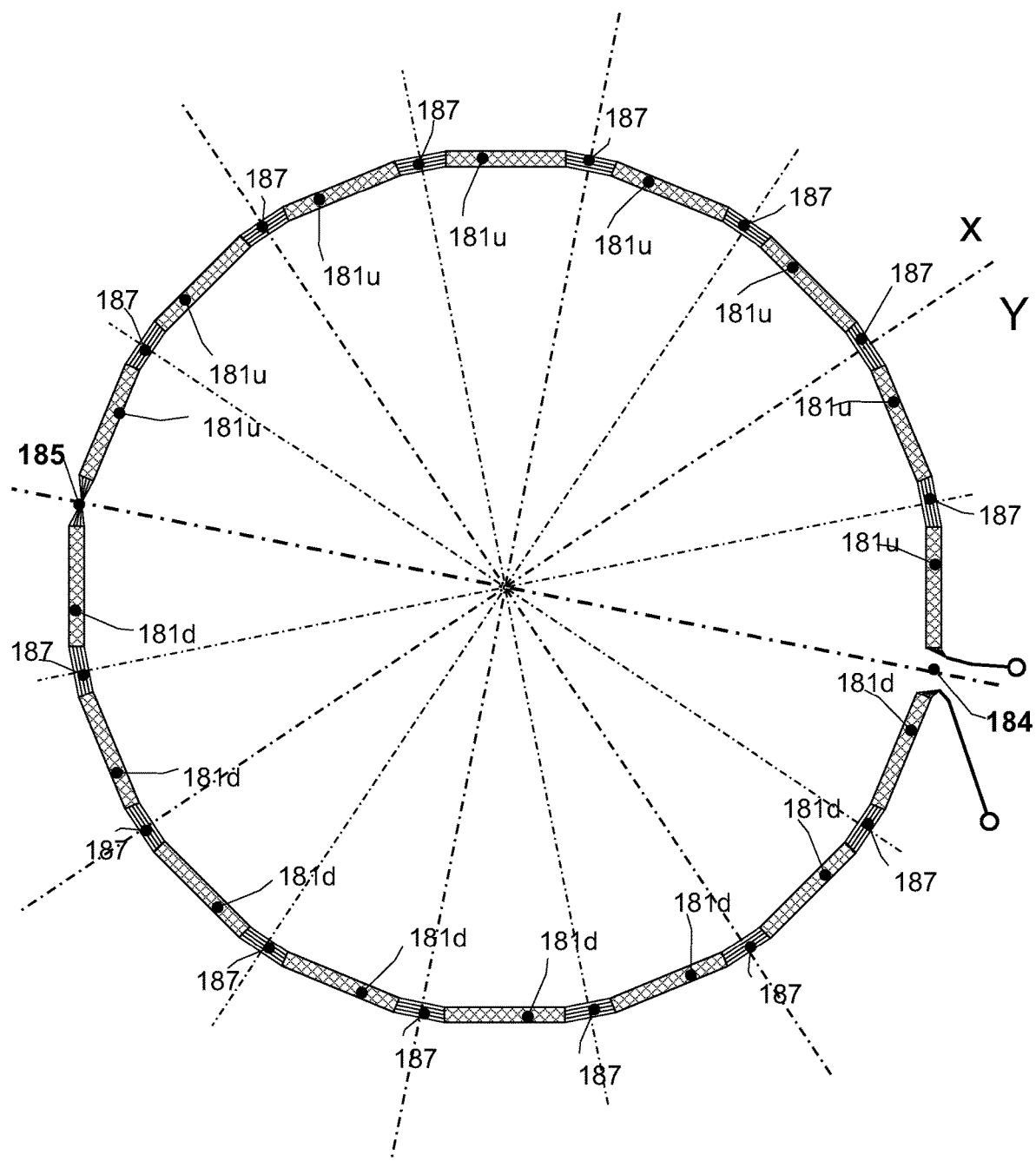
Figure 18:
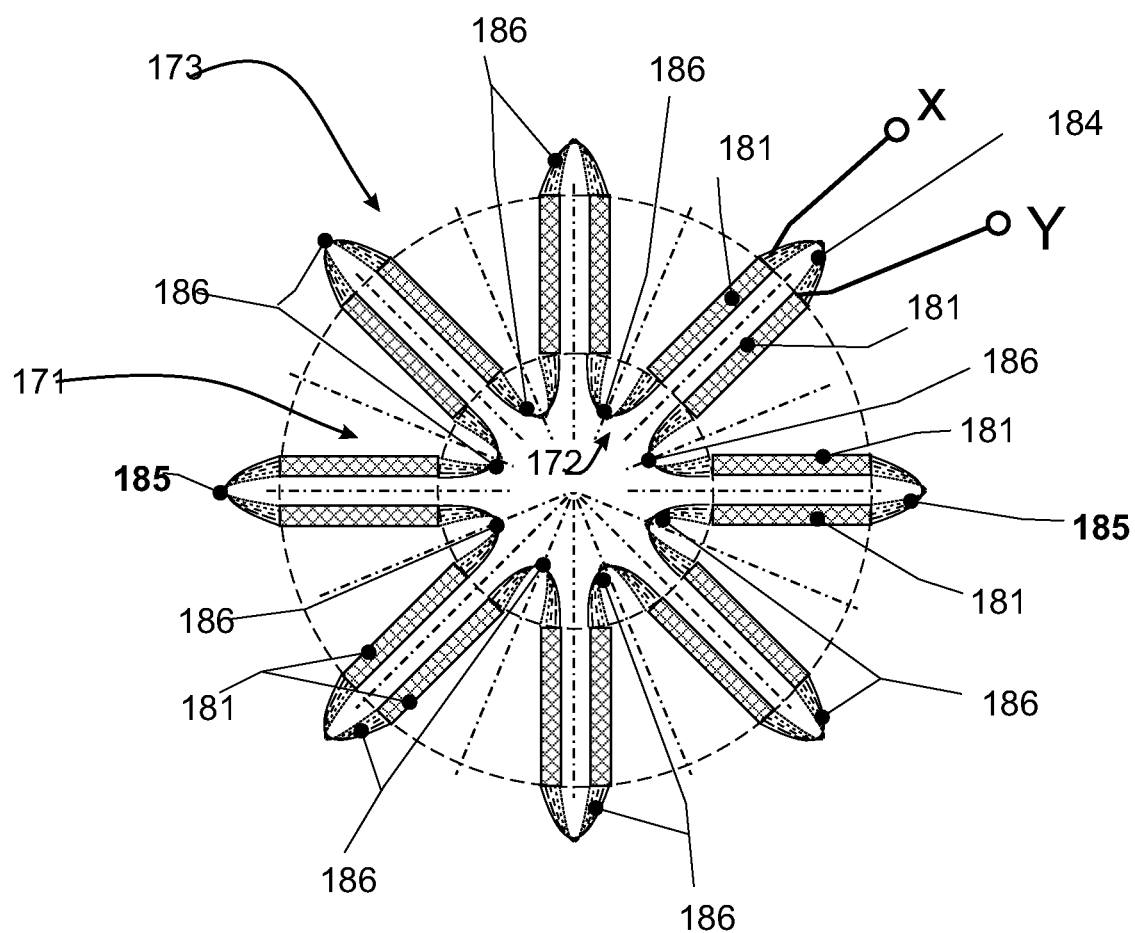
Figure 19:
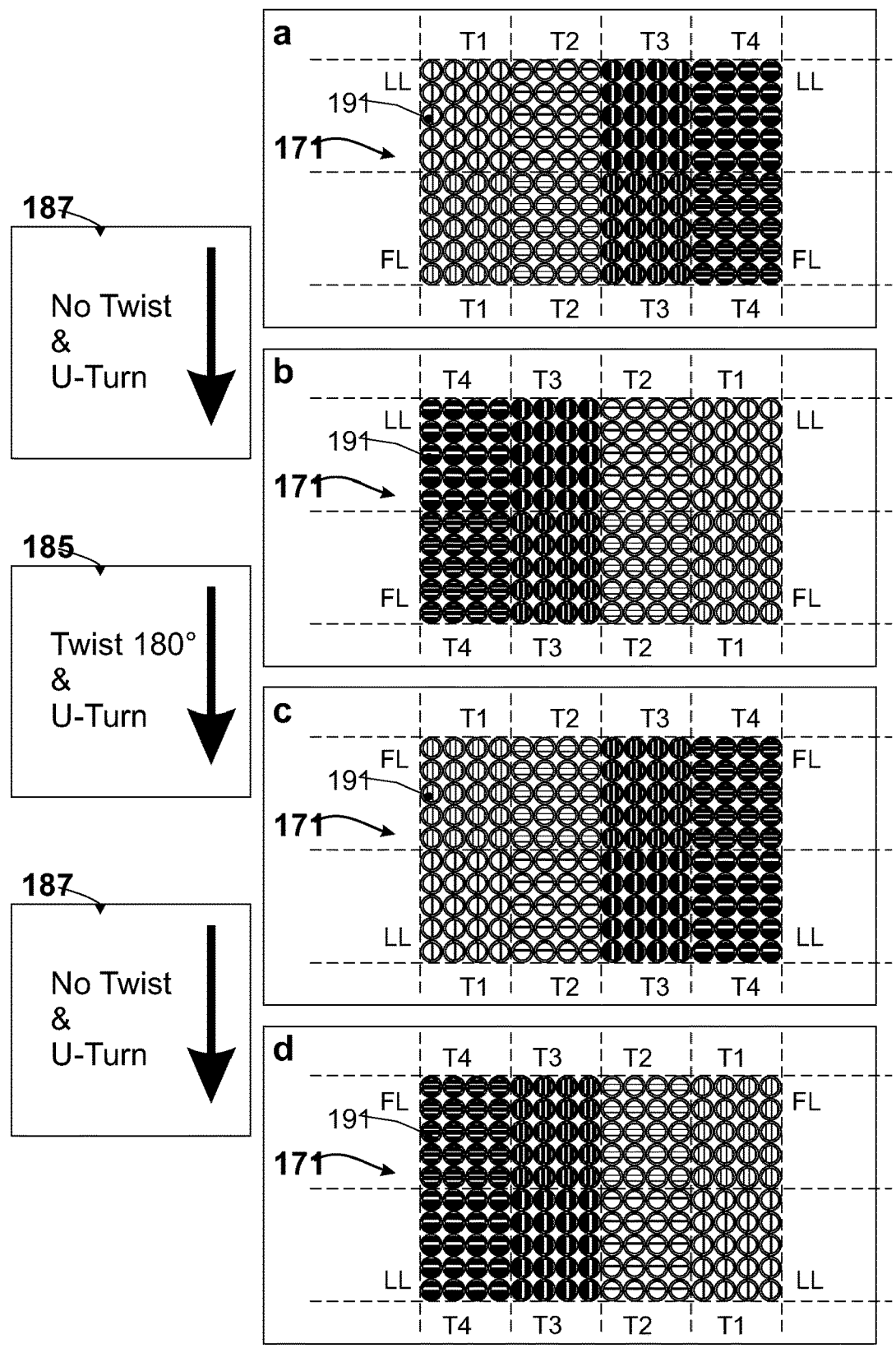
Figure 20:
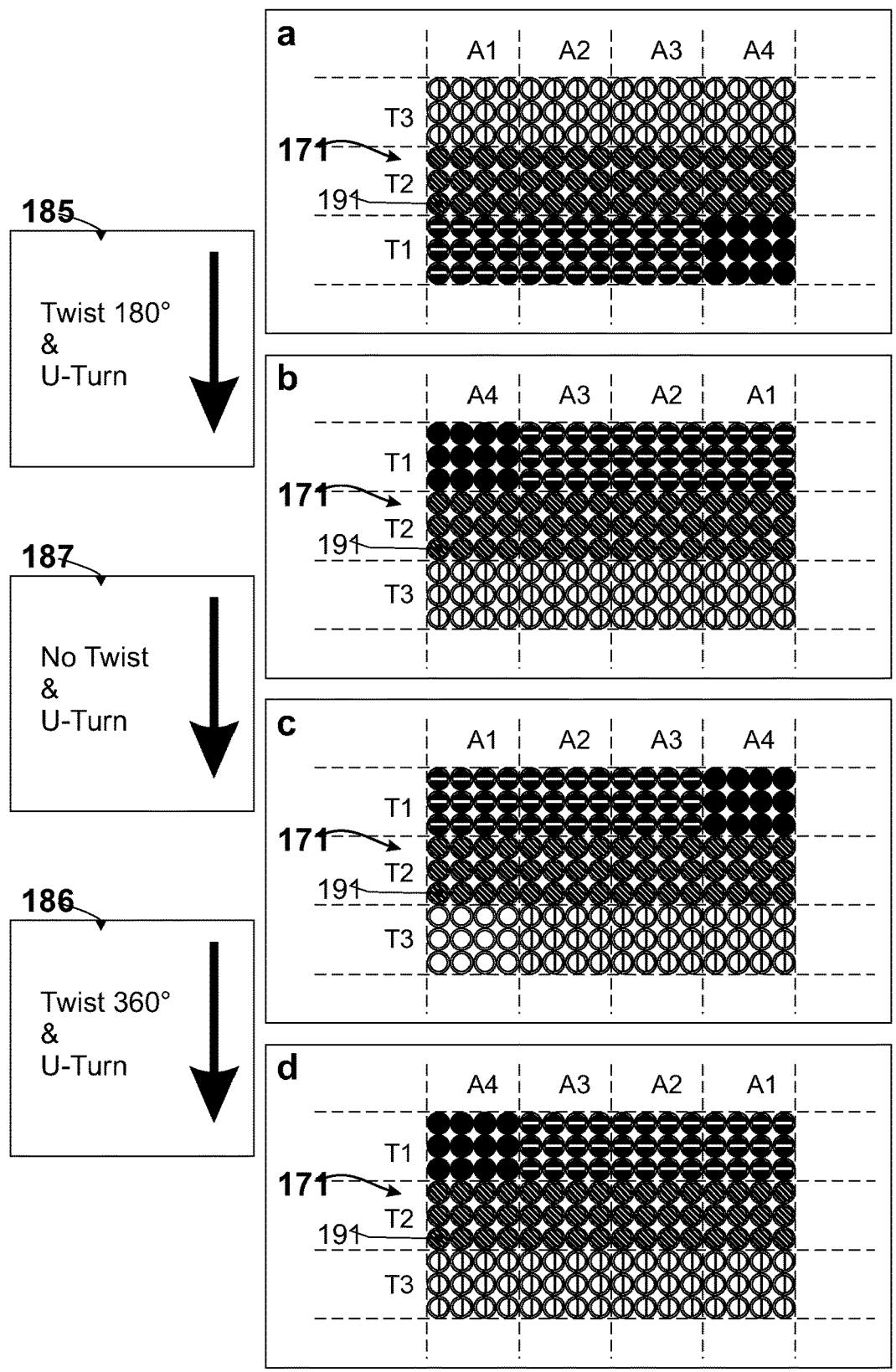

Some examples of the present disclosure will now be described, by way of example only, with reference to the figures, in which:

FIG. 1 shows a schematic diagram of an electric machine with a stator and a rotor.
FIG. 2 shows a schematic diagram of a stator winding.
FIG. 3 shows a schematic diagram of a stator winding.
FIG. 4 shows a schematic diagram of a stator winding.
FIG. 5 shows a schematic diagram of a stator winding.
FIG. 6 shows a schematic diagram of a stator winding.
FIG. 7 shows a schematic diagram of a stator winding.
FIG. 8 shows a schematic diagram of a stator winding.
FIG. 9 shows a schematic diagram of a stator winding.
FIG. 10 shows a schematic diagram of a stator winding.
FIG. 11 shows a schematic diagram of a stator winding.
FIG. 12 shows a schematic diagram of a stator winding.
FIG. 13 shows a schematic diagram of a stator winding.
FIG. 14 shows a schematic diagram of a radial gap electric machine.
FIG. 15 shows a schematic diagram of a step in a method of manufacturing a stator winding.
FIG. 16 shows a schematic diagram of a stator winding.
FIG. 17 shows a schematic diagram of a stator winding.
FIG. 18 shows a schematic diagram of a step in a method of manufacturing a stator winding.
FIG. 19 shows a schematic diagram of cross-sections of subsequent active segments.
FIG. 20 shows a schematic diagram of cross-sections of subsequent active segments.

In the drawings like reference numerals are used to indicate like elements.

SPECIFIC DESCRIPTION

Embodiments of the present disclosure are directed to stators for electric machines. In particular, a stator is provided with one or more phase windings. The phase windings are arranged with insulated conductors which are bent and twisted in inactive regions of the stator. The conductors may be straight and untwisted across the active region of the stator. The conductors are then twisted and bent in the inactive region so that the arrangement and/or orientation of the conductors will change. The distribution of conductive elements will vary about the active region of the stator. This may lead to a more uniform distribution of field within the stator, and also may reduce circulating voltage losses when operating the stator.

FIG. 1 shows an electric machine 1. The top part of FIG. 1 is a cross-sectional view of the electric machine (e.g. in a plane running through a rotational axis). The bottom part of FIG. 1 is a cross-sectional view of the electric machine in the plane A-B.

The electric machine includes a stator 10 and a rotor 2. An air gap 9 is provided between the rotor 2 and the stator.

The stator 10 includes a phase winding 7 and a flux ring 8. The stator 10 has an active region, and first and second inactive regions. An active segment 71 is shown in the active region. A first inactive segment 72 is shown in the first inactive region and a second inactive segment 73 is shown in the second inactive region.

The rotor 2 has a central shaft 21, a coupling member 22 and a plurality of permanent magnets 6.

The electric machine 1 includes a housing 4 with a bearing assembly 3. The housing 4 includes a mounting plate 5.

In the example of FIG. 1, the electric machine 1 is a radial gap machine. The electric machine 1 may be a motor, in which case the stator 10 may be used to drive rotation of the rotor 2, and/or it may be a generator, in which case the stator 10 may be used to harness electrical energy generated by rotation of the rotor 2.

The stator 10 and rotor 2 are housed within the housing 4. The housing 4 and the mounting plate 5 surround the stator 10 and rotor 2 to house those components. The electric machine 1 is symmetrical about a central axis—the central axis is the rotational axis of the rotor 2.

The rotor 2 is provided radially within the stator 10 (and the housing 4). The central shaft 21 of the rotor 2 extends along the central axis (the rotational axis of the rotor 2). The central shaft 21 is coupled to the housing 4 via the bearing assembly 3. The bearing assembly 3 may comprise two bearing assemblies. A first bearing assembly 3 is provided at a first end of the central shaft 21 (where the shaft is surrounded by the housing 4. A second bearing assembly 3 is provided at a second region of the central shaft 21 away from the first end (where the shaft passes through the mounting plate 5). The mounting plate 5 is coupled to the shaft radially outward from the central shaft 21 (and the stator 10). The coupling member 22 extends radially outward from the shaft to provide an outer cylindrical drum for the rotor 2. The permanent magnets 6 are provided on the rotor drum.

The stator 10 is located radially outward from the rotor 2. The air gap 9 is provided as the radial gap between the permanent magnets 6 and the phase winding 7. The rotor 2 is cylindrical (e.g. the permanent magnets 6 are provided on a cylindrical surface). The stator 10 is cylindrical and hollow (e.g. the phase winding 7 is provided on a cylindrical surface). The cylindrical surface of the magnets 6 and phase winding 7 are separated by a hollow cylindrical air gap 9. The windings are provided on a mounting surface of the stator 10. The mounting surface is located radially outward of the windings so that they are inwardly facing (towards the magnets 6 of the rotor 2). The stator winding 7 is circumscribed by the flux ring 8. In other words, the flux ring 8 is arranged radially outward of the phase winding 7. The flux ring 8 is provided in the active region of the stator 10. The housing 4 is provided radially outward of the flux ring 8, to house all of the components within it.

With the rotor 2 inserted into the stator 10, the permanent magnets 6 of the rotor 2 are aligned with the active region of the stator 10. The permanent magnets 6 are located radially inward of the active region of the stator 10. The active region of the stator 10 extends along the extent of the permanent magnets 6 in a direction parallel to the rotational axis of the rotor 2. Thus, there are permanent magnets 6 located radially within the active region of the stator 10. No permanent magnets 6 are located radially within the inactive region of the stator 10. The magnetic field in the active region is therefore much higher than in the inactive region of the stator 10. The inactive regions are outside the longitudinal extent of the permanent magnets 6. The inactive regions are separated by the active region. In other words, a cylindrical surface of the stator 10 provides the active region, and regions either side of that cylindrical surface (along its axial length) are inactive regions.

The phase winding 7 turns in the inactive region so that it may return to the active region. In the first inactive region, the first inactive segment 72 extends radially outward as it turns. The winding 7 in the first inactive region may extend further radially away from the rotational axis of the rotor 2 than the winding 7 in the active region. An inner surface of the first inactive segment 72 may be located the same distance away from the rotational axis as an inner surface of the first active segment 71. An outer surface of the first inactive segment 72 may be located further away from the rotational axis as compared to an outer surface of the first active segment 71. The first inactive segment 72 may curl radially outwards as it turns around through 180 degrees to return to the active region.

In the second inactive region, the second inactive segment 73 extends radially inwards as it turns around. The second inactive segment 73 may extend towards the rotational axis into a hollow region of the housing 4 of the rotor 2. An inner surface of the second inactive segment 73 may be located closer to the rotational axis of the rotor 2 as compared to an inner surface of the active segment 71. The second inactive segment 73 may curl radially inwards as it turns around through 180 degrees to return to the second active region. In the region of the active segment 71 and the second inactive segment 73, the housing 4 may be cylindrical. The housing 4 may taper radially outwards in the region of the first inactive segment 72. The first and second inactive segments may fit radially within the housing 4 in regions outside the longitudinal extent of the magnets 6 on the rotor 2.

The rotor 2 is configured to spin about its rotational axis. The bearing assembly 3 is configured to permit rotation of the rotor 2 (e.g. spinning about its rotational axis) relative to the stator 10 (and housing 4). The permanent magnets 6 of the rotor 2 may therefore move (rotate) relative to the phase winding 7 of the stator 10).

The active segments of the phase winding 7 are arranged to extend across the active region of the stator 10. The active segments may extend in a straight direction which runs parallel to the rotational axis of the rotor 2. The inactive segments are arranged to couple adjacent active segments so that each active segment 71 may extend in a straight direction across the active region. Each adjacent active segment 71 will extend across the active region in the opposite direction (e.g. from the first to the second inactive region, then from the second to the first inactive region). Active segments may be provided through 360 degrees of the active region of the stator 10. The inactive segments may be arranged to enable straight active segments to span across the entirety of the active region of the stator 10.

In some, or all, of the inactive regions, the inactive segments may be twisted. For example, the phase winding 7 may twist as it turns around in one or more of the inactive regions. Twisting of the phase winding 7 will now be described with reference to subsequent figs.

The top part of FIG. 2 shows a zoomed in cross-sectional view of phase windings of the stator 10. The bottom part of FIG. 2 shows a zoomed-out view of a portion of an electric machine 1 where the zoomed-in view is taken from.

In the example of FIG. 2, the stator 10 has three phase windings. As shown, there is a first phase winding denoted 'I', a second phase winding denoted 'II', and a third phase winding denoted 'III'. The top part of FIG. 2 shows a cross-section in the active region of the stator 10. Two active segments are shown for each of the phase windings. Each of the phase segments has one active segment 71 on the left-hand side of the central line and one on the right-hand side of the central line. An active segment 71 of each phase winding on the right-hand side is denoted by 71-I, 71-II, and 71-III respectively. The phase windings are arranged in order. The order repeats with each subsequent active region (e.g. I, II, III). In other words, the three phase windings are interlaced with each other. The three phase windings extend around the entirety of the active region of the stator 10. As they extend round, they remain in a fixed phase offset from each other (e.g. they trace the same shape as they extend around the active region). Reference numerals 61 and 62 show the different pole directions for the different active segments. As can be seen, between a first active segment 71 and a subsequent active segment 71 for each of the phase windings, the pole direction has changed (e.g. as the current carrying elements have now turned through 180 degrees.

In addition to turning through 180 degrees in an inactive region, the phase winding may also be twisted in the inactive region. An example of such twisting will now be described with reference to FIG. 3.

FIG. 3 shows a schematic of a phase winding. In the central portion of FIG. 3, a diagram shows the shape that a phase winding may take as it extends around the stator 10. As will be appreciated, FIG. 3 shows a flattened view, but for a radial gap stator, the surface would be cylindrical. The phase winding includes a series of active segments 71 in the active region of the stator 10. The dashed lines across the figure show where the active region lies. Above and below those dashed lines are the inactive regions. The first inactive region is shown at the bottom of the figure with first inactive segments 72, and the second inactive region is shown at the top of the figure with second inactive segments 73.

The phase winding is made up of a plurality of conductive element. Each conductive element comprises a conductor (e.g. copper wire) surrounded by an electrically insulating housing. Within a phase winding, there may be a plurality of such conductive elements. The conductive elements may be arranged together into a bundle of conductive elements.

The active segments extend across the active region of the stator 10 from one inactive region to the other. The active segments extend across the active region in alternating directions from one active segment 71 to the next. Each time the active segments extend across the active region, they extend straight across the active region. For a radial gap stator 10, these active segments will extend across the active region parallel to the rotational axis. The active segments are all parallel to each other. The bundle of conductive elements may take the same shape (in cross-section) for each active segment 71. However, the arrangement of conductive elements within that bundle may change as the bundle is twisted.

The inactive segments in the first inactive region are all the same. These first inactive segments 72a have no twist in the first inactive region. As can be seen, as the bundle of conductive elements enters the first inactive region from the active region, the bundle turns through 180 degrees back towards the active region. As the bundle turns, the conductive elements which start on the outside of the turn remain on the outside of the turn all the way round and back into the active region. Likewise, the conductive elements on the inside of the turn remain on the inside of the turn. As can be seen in FIG. 3, the left-most conductive elements on the way into the first inactive region exit the first inactive region back into the active region as the right-most conductive elements. Likewise, the right-most elements on entry exit as the left-most elements.

In this sense, when looking at a cross-section of the active segment 71 before and after passing through the first inactive region, the arrangement of conductive elements within the bundle will be the same. That is, when looking at the cross-section in a direction opposite to the direction which the conductive elements are extending (e.g. opposite to the direction of current flow). When looking at the cross-section of adjacent active segments before and after turning in the first inactive region in the same plane (i.e. looking at both cross-sections from the same direction), one active segment 71 will be a mirror image of the other (about a plane perpendicular to the separation distance of the two active segments).

In the second inactive region, three different arrangements for second inactive segments are shown. Of these, there is a non-twisted second inactive segment 73.a, a half-twisted second inactive segment 73.c, and a quarter-twisted second inactive segment 73.d.

The non-twisted second inactive segment 73.a is the same as the non-twisted segments shown in the first inactive region.

The half-twisted second inactive segment 73.c has a twist so that the arrangement of conductive elements within the bundle changes as it moves through the second inactive region. In this example, the bundle of conductive elements is twisted so that the left-most conductive elements entering the second inactive region also exit the second inactive region as the left-most conductive elements. Likewise, the right-most conductive elements on entry are the right-most conductive elements on exit. Thus, when viewing the elements on exit and entry in the same plane in the same direction, they will look identical. However, when viewing them in the same plane but in a direction opposite to the current flow, they will be a mirror image about the centre line.

The quarter-twisted second inactive segment 73.d has a twist so that the arrangement of conductive elements within the bundle changes as it moves through the second inactive region. In this example, the bundle of conductive elements is twisted so that the elements enter aligned in a plane parallel to the surface of the stator 10 and they exit aligned in a plane perpendicular to the surface of the stator 10. In other words, the elements on exit have been rotated about 90 degrees relative to the elements on entry.

As such, the active segments will be straight and untwisted, and they will run parallel to each other. However, the arrangement of conductive elements within the active segments will change. In particular, as the conductive elements pass through the half and quarter twisted second inactive segments, the arrangement of conductive elements within the bundle will change (e.g. relative to the magnets 6 on rotor 2). Consequently, for at least one of the conductive elements, that element will be either closer to, or further away from, the magnets 6 on the rotor 2 in adjacent active segments which have been coupled to each other via an inactive segment with a twist in. The conductive elements may be the same length in the inactive regions or they may not.

In the example shown in FIG. 3, the black rectangles shown in the cross-sectional views above and below the main diagram of the shape of the winding represent a first turn of a 4 turn phase winding and the other white rectangles represent the other 3 turns. The position of the black first turn is changing, depending on the type of bending and twisting in the inactive regions. This may enable the voltage integral along the entirety of the active region of the stator 10 in of the all conductive elements of the phase winding to minimize circulating voltage losses.

The top part of FIG. 4 shows a cross-sectional view of a stator 10 including a phase winding (e.g. in a plane running through the rotational axis). The bottom part of FIG. 4 shows a cross-sectional view in the plane C-D (in the active region of the stator 10). In this example, the stator 10 is a three phase sixteen pole winding.

FIG. 4 shows the stator 10 with three phase windings. As can be seen, the stator winding is straight in the active region, but not straight in the first and second inactive regions. As with the stator 10 described above, the first inactive segments comprise a turn which extends radially outwards in the first inactive region. The second inactive segments comprise a turn which extends radially inwards in the second inactive region. The three phase windings run parallel in the active region. The three phase windings are not parallel in the inactive region. Instead, the phase windings are arranged in a staggered formation so that each phase winding may pass through other phase windings in the inactive region to retain the organisation of phase windings in the active region (e.g. I, II, III, I, II, III). For example, each inactive segment may extend radially inwards or outwards to provide a three-dimensional turn. Each inactive segment may pass within the three-dimensional bend of one or more other inactive segments.

The top part of FIG. 5 shows a zoomed-in view of a phase winding of a stator 10, and the bottom part of FIG. 5 shows a further zoomed-in view of the phase winding of the stator 10. The cross-section is taken in an active region of the stator 10. In the example of FIG. 5, the stator 10 also includes one or more winding support structures. The winding support structures are configured to mechanically support conductive elements of each phase winding. The support structures may be configured to hold a bundle of conductive elements together (e.g. in a parallel configuration). The support structures may include a bundle support structure 76. The bundle support structure 76 is arranged to surround each phase winding to hold the phase winding in a selected cross-sectional shape. The bundle support structure 76 may hold the individual phase winding active segments in a parallel arrangement with each other.

The top part of FIG. 6 shows a schematic diagram to illustrate exemplary changes in phase windings of a stator 10. The bottom part of FIG. 6 shows a zoomed-in view of one region of the top part of FIG. 6. The cross-section of FIG. 6 is in the active region of the stator 10.

FIG. 6 shows a stator 10 with three phase windings. 4 active segments are shown (SX, S1, S2, and S3). Each of the three phase windings has 4 turns (e.g. conductive elements) per phase. Each of these turns is indicated as 'a', 'b', 'c', and 'd' to indicate how their arrangement changes between adjacent segments (due to twisting in the inactive region). To illustrate this, the first turn d for the first phase winding is shown as a black rectangle. As can be seen, between sectors S1 and S2 and between sections S2 and S3, the arrangement of phase windings changes. Active segments 71.x-I, 71.x-II, ad 71.x-III are shown to illustrate how the arrangement changes between adjacent active segments.

The top part of FIG. 7 shows a schematic diagram to illustrate exemplary changes in phase windings of a stator 10. The bottom part of FIG. 7 also shows a schematic diagram to illustrate exemplary changes in phase windings of a stator 10, but in a subsequent region of the stator 10. The cross-section of FIG. 7 is in the active region of the stator 10. Again, two adjacent active segments Sn and Sn+1 are shown. Each of the three phase windings has four turns a, b, c, d (e.g. conductive elements, or groups of conductive elements). The four turns may provide the bundle. As can be seen, the arrangement within the active segments for a phase winding changes between the adjacent segments. The three phase windings remain in order (I, II, III, I, II, III), but the internal arrangement of at least one of the phase windings changes between adjacent active segments. For example, the internal arrangement of each of the windings changes from a, b, c, d to d, c, b, a.

The top part of FIG. 8 shows a cross-sectional view of a stator 10 including a phase winding (e.g. in a plane running through the rotational axis). The bottom part of FIG. 8 shows a cross-sectional view in the plane C-D (in the active region of the stator 10). One phase winding is shown although more may be provided. The winding may have a support structure in the inactive regions (shown by black fill). An inner side of the active region may have a winding support structure 76. The winding support structure 76 may comprise a coating, such as a polymer coating. The winding support structure 76 may be configured to support the phase windings to hold them in place on a mounting surface of the stator 10.

FIGS. 9 to 11 show schematic diagrams of exemplary arrangements of phase windings for a stator 10.

FIG. 9 shows a region of the stator 10 with three phase windings. Again, the view is flat, but for a radial gap this would be on the surface of a cylinder. As shown, the three phase windings are interlaced with each other in a repeating pattern. The active segments are adjacent to each other and parallel. The inactive segments are arranged to maintain the interlaced pattern of the three phase windings. For example, in the inactive regions, the phase windings may be bent in a three-dimensional pattern to enable phase windings to pass through gaps in the adjacent phase windings in the inactive regions. FIG. 10 illustrates such an exemplary arrangement in which the inactive segments extend radially inwards/outwards so that adjacent segments may pass through each other to return to the active region. There may be different bending patterns for the different inactive segments. The repeating pattern of active segments (I, II, III) is maintained, and the turn in the inactive segments is arranged to enable this pattern to be maintained with the individual inactive segments passing through each other in the inactive regions. Three-dimensional bending in the inactive region may enable the longitudinal extent of the phase winding to be reduced (e.g. to take up less volume inside the housing 4). This may improve thermal conductivity, as well as size reduction. FIG. 11 shows a stator 10 with different types of twist in the inactive region. For example, as the turns in the inactive region move radially inward/outward, there may also be twists in these regions (and these twists may differ). For example, quarter and/or half twists may be provided. Also, adjacent segments may have different twists in the same inactive region.

FIGS. 12 and 13 show a schematic diagram of an arrangement of phase windings for a stator 10.

Examples described above have been directed to radial gap electric machines. The present disclosure may also extend to axial gap electric machines. In which case, the stator 10 and rotor 2 will not be separated cylindrically from each other, and instead the stator 10 and rotor 2 may both be cylinders which are axially offset. The phase winding will instead be provided on a circular surface of the cylinder (rather than on a cylindrical surface). As a result, the phase windings extend radially inward and outward on the flat circular surface (rather than on the cylindrical surface running parallel to the rotational axis).

FIGS. 12 and 13 show such an arrangement. The active region of the stator 10 is an annular region. The region radially inward of the annulus is the first inactive region, and the region radially outward of the annulus is the second inactive region. The phase windings extend across the active regions between the first and second inactive regions. As shown, the phase windings and segments are more closely packed in the inner region than in the outer region. Adjacent active segments are not parallel but they would all intersect in the centre of the circle if they continued in a straight line that far. FIGS. 12 and 13 also shows terminal ends X and Y for each of the three phase windings. The terminal ends are for coupling the phase windings to a power source (for a motor) or means for harvesting generated power (for a generator). FIG. 13 shows a similar arrangement to FIG. 12 but with three-dimensional turns in the inactive regions, so that the inactive segments may pass through each other in returning to the active region.

FIG. 14 shows an electric machine 1. The top part of FIG. 14 is a cross-sectional view of the electric machine 1 (e.g. in a plane running through a rotational axis). The bottom part of FIG. 14 is a cross-sectional view in the plane A-B. The electric machine 1 is similar to that of FIG. 1 except the rotor 2 is shown with a spoke coupling 24 for coupling the central shaft 21 to a rotor drum 23 on which the permanent magnets 6 are provided. One or more holes may be provided in the housing 4 for passing the terminal wires of the stator 10 out through the housing 4.

FIG. 15 shows a step in a method of manufacturing a phase winding.

FIG. 15 shows an intermediate step of an exemplary production method for manufacturing a phase winding of the present disclosure. The phase winding includes a plurality of active segments 181, and inactive segments 182, 183. Also shown are terminal conductors 184 for connecting the stator winding to an external component, such as a power source (for motor) or power drain (for generator). The active segments 181 of the phase winding are straight and formed of parallel conductive elements. For example, for this, clamping and/or potting tools may be used which cover just the active areas segments 181, or additive manufacturing of conductive elements may be provided to provide a parallel arrangement of conductive elements by fixation means or fixation materials, such as baking enamel, polymer or UV curing resin etc. The cross-sectional shape and/or curvature of the inactive regions may be different. Inactive areas may be bent afterwards, to provide a serpentine arrangement of active areas as shown in earlier Figs. The conductive elements may be moulded and/or fused together in the active regions (e.g. to provide a bundle).

FIG. 16 shows a schematic diagram of a phase winding in which each of the active segments 181 is arranged in one of two configurations: an 'up' configuration (shown by reference numerals 181$u$), and a 'down' configuration (shown by reference numerals 181$d$). As shown, the inactive segments are split between: (i) twisted inactive segments 185 in which the conductive elements bend back towards the active region with a twist, and (ii) non-twisted inactive segments 187 in which the conductive elements just bend back towards the active region without twisting. As shown, the two twisted inactive segments 185 are distributed evenly (e.g. opposite to each other). On one half, the active segments are therefore in the up configuration, and in the down configuration for the other half.

FIG. 17 shows a similar arrangement to that of FIG. 16, except there is only one twisted inactive segment 185 in the winding of FIG. 17. The twisted inactive segment 185 is on an opposite side of the phase winding to the terminal conductors 184. Half of the active segments are in the up configuration, and half in the down configuration. Some or all of the non-twisted inactive segments may be replaced by inactive segments in which the conductive elements (or the bundle of conductive elements) are twisted through 360° so that they are in the same configuration in adjacent active segments, despite being twisted in the inactive segment separating those two active segments. Such an arrangement may reduce volume requirements for the phase winding.

FIG. 18 shows a schematic diagram of a step in a method of manufacturing a stator winding. In particular, FIG. 18 shows a potential intermediate step in the process of manufacturing a phase winding with more than 1 turn per phase. FIG. 18 shows an active region 171, as well as a first inactive region 172 and a second inactive region 173. The phase winding includes two twisted inactive segments 185 which are twisted, but not through 360° (e.g. inactive segments in which a partial twist is provided). The remaining inactive segments are 360° twisted inactive segments 186 (although these could of course be provided instead by inactive segments which turn through 720° or higher multiples of 360°, and/or inactive segments without twists). The number of active segments in each configuration is the same (e.g. the partial twists are distributed about the winding so that the number of active segments in one configuration is balanced out by the number in an opposite configuration, such as the distribution of 'ups' and 'downs' in FIGS. 16 and 17).

FIG. 19 shows a subsequent series of cross-sections through four active segments 181. The phase winding comprises a plurality of conductive elements 191 arranged in a bundle. In this example, the bundle is arranged in a rectangular form, but other options could be used. 160 conductive elements 191 are shown across four turns (T1, T2, T3, and T4). To illustrate the different changes in arrangement, a first layer FL and a last layer LL are indicated.

As can be seen, between 'a' and 'b', no twist is provided while the bundle turns in the inactive segment. As such, the order is reversed (from T1 to T4 to T4 to T1), and the first and last layers remain the same as they were. This is a no twist turn 187. Between 'b' and 'c', a 180° twist is provided while the bundle turns in the inactive segment. As such, the order and layering is reversed. That is, the four turns change order again, and the first and last layers have switched. This is a 180° twist turn 185. Between 'c' and 'd', a corresponding change occurs as to that between 'a' and 'b', only the layers remain (so that the first and last layers are different compared to the first no twist turn 187.

FIG. 20 shows a similar arrangement to that of FIG. 19. Three layers are shown in FIG. 20 (T1, T2, T3). Between 'a' and 'b', a 180° twist is provided while the inactive segment turns. As such the order of the turns reverses, as does the order of the layers. Between 'b' and 'c', no twist is provided, and so the order of turns changes, but the order of layers remains the same. Between 'c' and 'd', a 360° twist is provided. As can be seen, the turns again swap order, but the order of layers remains the same. This is a 360° twist 186. With reference to the darkest rectangle (with filled circles), it can be seen how the position of conductive elements changes within the bundle. These changes are controlled to minimised the voltage integral associated with the phase winding.

It will be appreciated from the discussion above that the examples shown in the figures are merely exemplary, and include features which may be generalised, removed or replaced as described herein and as set out in the claims. With reference to the drawings in general, it will be appreciated that schematic functional block diagrams are used to indicate functionality of systems and apparatus described herein.

As will be appreciated by the skilled reader in the context of the present disclosure, each of the examples described herein may be implemented in a variety of different ways. Any feature of any aspects of the disclosure may be combined with any of the other aspects of the disclosure. For example, method aspects may be combined with apparatus aspects, and features described with reference to the operation of particular elements of apparatus may be provided in methods which do not use those particular types of apparatus. In addition, each of the features of each of the examples is intended to be separable from the features which it is described in combination with, unless it is expressly stated that some other feature is essential to its operation. Each of these separable features may of course be combined with any of the other features of the examples in which it is described, or with any of the other features or combination of features of any of the other examples described herein. Furthermore, equivalents and modifications not described above may also be employed without departing from the invention. Other examples and variations of the disclosure will be apparent to the skilled addressee in the context of the present disclosure.

The invention claimed is:

1. A stator for interacting with magnets carried by a rotor of an electric machine, the stator comprising:
    an active region arranged to be aligned with the magnets carried by the rotor;
    a first inactive region and a second inactive region, wherein the first and second inactive regions are separated by the active region; and
    a slotless phase winding comprising a plurality of conductive elements, wherein each conductive element comprises a conductor provided in an insulating housing, and wherein the slotless phase winding is arranged in a serpentine structure comprising:
    a first active segment in which the conductive elements extend across the active region from the first inactive region to the second inactive region;
    a second active segment in which the conductive elements extend across the active region from the second inactive region to the first inactive region; and
    an inactive segment coupling the first active segment to the second active segment, wherein the inactive segment comprises a turn provided in the second inactive region, and wherein at least one of the conductive elements is twisted in the second inactive region;
    wherein the conductive elements extend straight and untwisted across the active region.

2. The stator of claim 1, wherein the plurality of conductive elements are substantially parallel with each other in the first and/or second active segment.

3. The stator of claim 1, wherein the conductive elements in the first active segment are substantially parallel to the conductive elements in the second active segment.

4. The stator of claim 1, wherein the slotless phase winding is a first slotless phase winding, and wherein the stator is a multi-phase slotless stator comprising a plurality of slotless phase windings.

5. The stator of claim 4, wherein the first active segment of the first slotless phase winding is offset from the second active segment of the first slotless phase winding in the active region.

6. The stator of claim 5, wherein each of the plurality of slotless phase windings is arranged in a serpentine structure, wherein the serpentine structure of the first slotless phase winding is interlaced with the serpentine structure of one or more of the other slotless phase windings of the stator, and wherein a first active segment of a second slotless phase winding is arranged between the first and second active segments of the first slotless phase winding.

7. The stator of claim 6, wherein an inactive segment of the second slotless phase winding is coupled to the first active segment of the second slotless phase winding; and
    wherein the inactive segment of the second slotless phase winding comprises a turn provided in the second inactive region, and wherein at least one of the conductive elements of the second slotless phase winding is twisted in the second inactive region.

8. The stator of claim 7, wherein the stator is arranged to enable the conductive elements of the turn of the first slotless phase winding to pass through the turn of the second slotless phase winding, and wherein the second active segment of the first slotless phase winding is arranged in the active region between first and second active segments of the second slotless phase winding.

9. The stator of claim 7, wherein the turn of the first slotless phase winding is arranged adjacent to the turn of the second slotless phase winding.

10. The stator of claim 7, wherein the first slotless phase winding is provided with the same twist as the second slotless phase winding.

11. The stator of claim 4, wherein a first active segment of a third slotless phase winding is provided in the active region between the first and second active segments of the first slotless phase winding.

12. The stator of claim 1, wherein the inactive segment of the serpentine structure of the slotless phase winding is a first inactive segment, and wherein the serpentine structure of the slotless phase winding further comprises a second inactive segment and a third active segment; and
    wherein the second inactive segment couples the second active segment to the third active segment, and wherein the second inactive segment comprises a turn provided in the first inactive region, wherein at least one of the conductive elements is twisted in the first inactive region, and wherein the twist in the first inactive region comprises a half twist, and the twist in the second inactive region also comprises a half twist.

13. The stator of claim 1, wherein the conductive filaments of the slotless phase winding are packaged into a fiber bundle, and wherein the fiber bundle has an orthogonal or hexagonal cross-sectional shape.

14. The stator of claim 1, wherein the conductor of each conductive element is rectangular, circular or hexagonal cross-sectional shape.

15. The stator of claim 1, wherein the stator is arranged to provide a radial air gap between the stator and the rotor; and wherein the active segments of the slotless phase winding extend in an axial direction parallel to a rotational axis of the rotor.

16. The stator of claim 1, wherein the stator is arranged to provide an axial air gap between the stator and the rotor; and
wherein the active segments of slotless phase winding extend in a radial direction orthogonal to the rotational axis of the rotor.

17. The stator of claim 1, wherein at least one of:
the stator is for interacting with magnets carried by a rotor of an electric motor, and wherein the stator is configured to apply current to the slotless phase winding to drive rotation of the rotor of the electric motor; and
the stator is for interacting with magnets carried by a rotor of a generator, and wherein the stator is configured to harness energy from a resulting current generated in the slotless phase winding in response to rotation of the magnets of the rotor of the generator.

18. An electric machine comprising:
the stator of claim 1; and
a rotor carrying a plurality of magnets;
wherein the electric machine is arranged so that the magnets carried by the rotor are aligned with the active region of the stator.

19. The electric machine of claim 18, wherein a distance of an air gap between the magnets of the rotor and the active region of the stator is smaller than a cross-sectional depth of the plurality of conductive elements of the slotless phase winding.

* * * * *